United States Patent
Fukagai

(10) Patent No.: US 10,803,364 B2
(45) Date of Patent: *Oct. 13, 2020

(54) CONTROL METHOD, NON-TRANSITORY COMPUTER-READABLE STORAGE MEDIUM FOR STORING CONTROL PROGRAM, AND CONTROL APPARATUS

(71) Applicant: FUJITSU LIMITED, Kawasaki-shi, Kanagawa (JP)

(72) Inventor: Takuya Fukagai, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 128 days.

This patent is subject to a terminal disclaimer.

(21) Appl. No.: 16/055,214

(22) Filed: Aug. 6, 2018

(65) Prior Publication Data

US 2019/0050694 A1 Feb. 14, 2019

(30) Foreign Application Priority Data

Aug. 10, 2017 (JP) ................. 2017-155262

(51) Int. Cl.
*G06K 9/00* (2006.01)
*G06K 9/66* (2006.01)
(Continued)

(52) U.S. Cl.
CPC .......... *G06K 9/66* (2013.01); *G06K 9/00335* (2013.01); *G06K 9/00664* (2013.01);
(Continued)

(58) Field of Classification Search
CPC ......... G06T 7/0069; G06T 7/262; G06T 7/20; G06T 9/66; G06T 7/74; G06T 7/246;
(Continued)

(56) References Cited

U.S. PATENT DOCUMENTS 5,708,473 A    1/1998  Mead
5,845,048 A *  12/1998 Masumoto ............. B25J 9/1697
                                                          706/20
(Continued)

FOREIGN PATENT DOCUMENTS

JP       2008-112210      5/2008

OTHER PUBLICATIONS

R. Girshick et al., "Rich feature hierarchies for accurate object detection and semantic segmentation", IEEE Conference on Computer Vision and Pattern Recognition (CVPR), 2014 (8 pages).
(Continued)

*Primary Examiner* — Duy M Dang
(74) *Attorney, Agent, or Firm* — Fujitsu Patent Center

(57) ABSTRACT

A control method includes: executing a first process that includes obtaining movement information on movement of an object from an image sequence; executing a second process that includes presuming a set of a candidate region in which an object may be present in a first image in the image sequence and an index indicating probability of presence of the object in the candidate region according to a feature amount of the first image; and executing a third process that includes determining a position of the object in the first image by using the set of the candidate region and the index presumed, wherein the second process includes correcting information obtained during the presuming based on the obtained movement information.

20 Claims, 30 Drawing Sheets

(51) Int. Cl.
  G06K 9/46 (2006.01)
  G06T 7/73 (2017.01)
  G06T 7/246 (2017.01)
  G06T 7/277 (2017.01)
  G06K 9/62 (2006.01)
  G06K 9/32 (2006.01)

(52) U.S. Cl.
  CPC ......... *G06K 9/3233* (2013.01); *G06K 9/4628* (2013.01); *G06K 9/6274* (2013.01); *G06T 7/246* (2017.01); *G06T 7/248* (2017.01); *G06T 7/251* (2017.01); *G06T 7/277* (2017.01); *G06T 7/74* (2017.01); *G06T 7/75* (2017.01); *G06K 2009/3291* (2013.01); *G06T 2207/10024* (2013.01); *G06T 2207/20081* (2013.01); *G06T 2207/30196* (2013.01)

(58) Field of Classification Search
  CPC ........... G06T 7/277; G06T 7/75; G06T 7/251; G06T 7/248; G06T 7/579; G06T 7/50; G06T 5/005; G06T 5/50; G06K 9/6267; G06K 9/3233; G06K 9/66; G06K 9/00335; G06K 9/00664; G06K 9/4628; G06K 9/6274; H04N 13/117; H04N 19/553; H04N 13/00; H04N 19/00
  See application file for complete search history.

(56) References Cited

U.S. PATENT DOCUMENTS 6,674,925 B1   1/2004   Schoepflin et al.
8,224,023 B2 * 7/2012   Greig ................. G06T 7/238
                                                382/103
9,842,255 B2 * 12/2017  Taguchi .............. G06T 7/73
2007/0097112 A1 5/2007  Greig
2016/0104058 A1 4/2016  He et al.
2018/0232907 A1 8/2018  Sung et al.
2019/0050994 A1 * 2/2019 Fukagai ............. G06K 9/3233

OTHER PUBLICATIONS

R. Girshick, "Fast R-CNN", IEEE International Conference on Computer Vision (ICCV), 2015 (9 pages).

S. Ren et al., "Faster R-CNN: Towards Real-Time Object Detection with Region Proposal Networks", Neural Information Processing Systems (NIPS), pp. 1-14, 2015 (14 pages).

X. Huynh et al., "Deep Learning-based Multiple Pedestrians Detection-Tracking Framework", Proceedings of HCI Korea 2016, pp. 55-60, 2016 (6 pages).

I. J. Cox et al, "An Efficient Implementation and Evaluation of Reid's Multiple Hypothesis Tracking Algorithm for Visual Tracking", in ICPR, pp. A:437-442, 1994 (6 pages).

I. J. Cox et al, "An Efficient Implementation of Reid's Multiple Hypothesis Tracking Algorithm and Its Evaluation for the Purpose of Visual Tracking", IEEE Transactions on Pattern Analysis and Machine Intelligence, vol. 18, No. 2, pp. 138-150, 1996 (13 pages).

Notice of Allowance dated Apr. 16, 2020 for copending U.S. Appl. No. 16/054,188, 6 pages.

* cited by examiner

REFERENCE CENTER POSITION

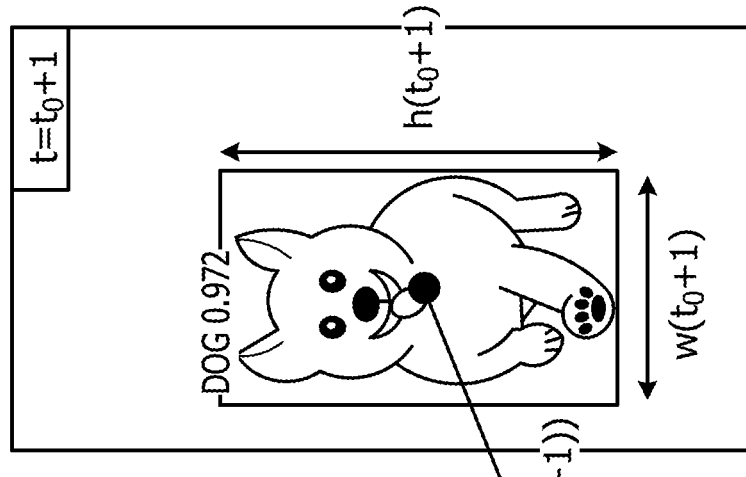
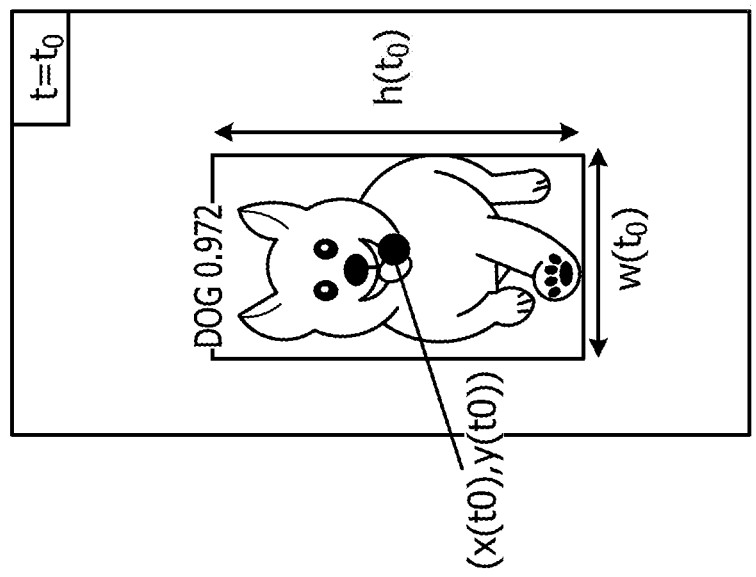
FIG. 18

FIG. 19

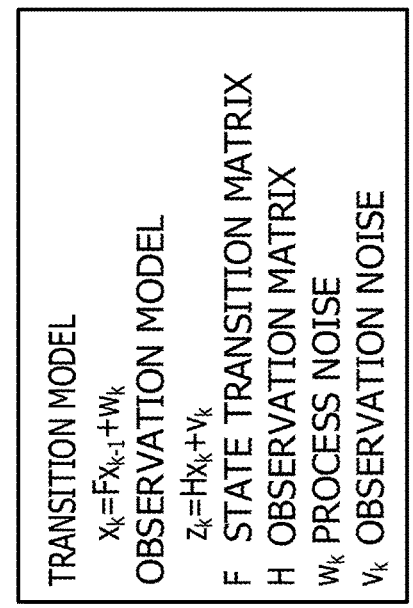
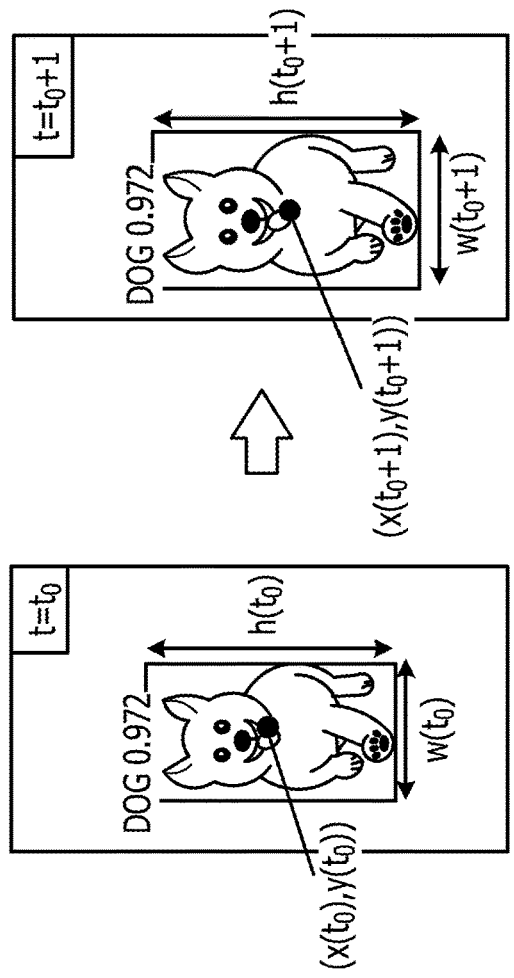

TRANSITION MODEL
$x_k = F x_{k-1} + w_k$
OBSERVATION MODEL
$z_k = H x_k + v_k$
F STATE TRANSITION MATRIX
H OBSERVATION MATRIX
$w_k$ PROCESS NOISE
$v_k$ OBSERVATION NOISE $$x_{c,i} = \begin{bmatrix} x_{c,i} \\ \dot{x}_{c,i} \\ y_{c,i} \\ \dot{y}_{c,i} \\ w_{c,i} \\ \dot{w}_{c,i} \\ h_{c,i} \\ \dot{h}_{c,i} \end{bmatrix} \quad F = \begin{bmatrix} 1 & dt & 0 & 0 & 0 & 0 & 0 & 0 \\ 0 & 1 & 0 & 0 & 0 & 0 & 0 & 0 \\ 0 & 0 & 1 & dt & 0 & 0 & 0 & 0 \\ 0 & 0 & 0 & 1 & 0 & 0 & 0 & 0 \\ 0 & 0 & 0 & 0 & 1 & dt & 0 & 0 \\ 0 & 0 & 0 & 0 & 0 & 1 & 0 & 0 \\ 0 & 0 & 0 & 0 & 0 & 0 & 1 & dt \\ 0 & 0 & 0 & 0 & 0 & 0 & 0 & 1 \end{bmatrix}$$

$$z_{c,j,k} = \begin{bmatrix} x_{c,j,k} \\ y_{c,j,k} \\ w_{c,j,k} \\ h_{c,j,k} \end{bmatrix} \quad H = \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \end{bmatrix}$$

$$Q = \begin{bmatrix} \frac{dt^3}{3} q_x & \frac{dt^2}{2} q_x & 0 & 0 & 0 & 0 & 0 & 0 \\ \frac{dt^2}{2} q_x & dt \cdot q_x & 0 & 0 & 0 & 0 & 0 & 0 \\ 0 & 0 & \frac{dt^3}{3} q_y & \frac{dt^2}{2} q_y & 0 & 0 & 0 & 0 \\ 0 & 0 & \frac{dt^2}{2} q_y & dt \cdot q_y & 0 & 0 & 0 & 0 \\ 0 & 0 & 0 & 0 & \frac{dt^3}{3} q_w & \frac{dt^2}{2} q_w & 0 & 0 \\ 0 & 0 & 0 & 0 & \frac{dt^2}{2} q_w & dt \cdot q_w & 0 & 0 \\ 0 & 0 & 0 & 0 & 0 & 0 & \frac{dt^3}{3} q_h & \frac{dt^2}{2} q_h \\ 0 & 0 & 0 & 0 & 0 & 0 & \frac{dt^2}{2} q_h & dt \cdot q_h \end{bmatrix}$$

FIG. 20
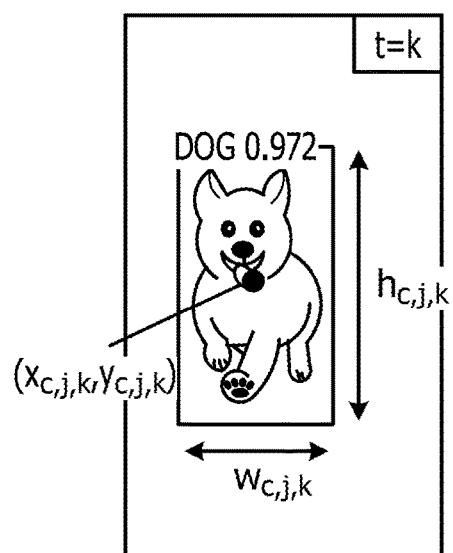
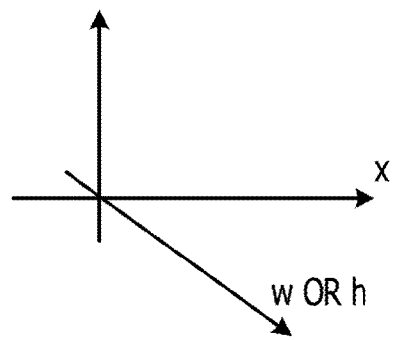

⊙ ESTIMATE OBTAINED IN PRECEDING FRAME
○ OBSERVATION POINT OBTAINED FROM IMAGE IN LATEST FRAME
  (DETECTED REGION BEFORE NARROWING)

180
CONTROL METHOD, NON-TRANSITORY COMPUTER-READABLE STORAGE MEDIUM FOR STORING CONTROL PROGRAM, AND CONTROL APPARATUS

CROSS-REFERENCE TO RELATED APPLICATION

This application is based upon and claims the benefit of priority of the prior Japanese Patent Application No. 2017-155262, filed on Aug. 10, 2017, the entire contents of which are incorporated herein by reference.

FIELD

The embodiments discussed herein are related to a control method, a non-transitory computer-readable storage medium for a control program, and a control apparatus.

BACKGROUND

Neural networks are sometimes used in information processing, for example, image processing. In one example, neural networks are used in presuming what object is present at which position in the image or image sequence.

A known example of a method for presuming the position and the type of an object using a neural network is Faster R-CNN. R-CNN is an abbreviation of "Regions with Convolutional Neural Network".

In Faster R-CNN, a computer presumes the candidate position of an object based on the feature amount of a still image and determines the position of the object while scoring based on the feature amount of the still image and the presumed candidate position.

It is also known in the related art that the computer tracks the motion of the object according to the detected position of the object specified in each still image.

Examples of the related art include US Patent Application, Publication No. 2016/0104058, Japanese Laid-open Patent Publication No. 2008-112210, "Rich feature hierarchies for accurate object detection and semantic segmentation", Ross Girshick, Jeff Donahue, Trevor Darrell, Jetendra Malik, IEEE Conference on Computer Vision and Pattern Recognition (CVPR), 2014, "Fast R-CNN", Ross Girshick, IEEE International Conference on Computer Vision (ICCV), 2015, "Faster R-CNN: Towards Real-Time Object Detection with Region Proposal Networks", Shaoqing Ren, Kaiming He, Ross Girshick, and Jian Sun, Neural Information Processing Systems (NIPS), 2015, "Deep Learning-based Multiple Pedestrians Detection-Tracking Framework", Xuan-Phung Huynh, Yong-Guk Kim, Proceedings of HCI Korea 2016, 2016, "An efficient implementation and evaluation of Reid's multiple hypothesis tracking algorithm for visual tracking," Ingemar J. Cox and Sunita L. Hingorani, ICPR, pp. A:437-442, 1994, and "An Efficient Implementation of Reid's Multiple Hypothesis Tracking Algorithm and Its Evaluation for the Purpose of Visual Tracking", Ingemar J. Cox and Sunita L. Hingorani, IEEE Transactions On Pattern Analysis And Machine Intelligence, Vol. 18, No. 2, pp. 138-150, 1996.

SUMMARY

According to an aspect of the invention, a control method includes: executing a first process that includes obtaining movement information on movement of an object from an image sequence; executing a second process that includes presuming a set of a candidate region in which an object may be present in a first image in the image sequence and an index indicating probability of presence of the object in the candidate region according to a feature amount of the first image; and executing a third process that includes determining a position of the object in the first image by using the set of the candidate region and the index presumed, wherein the second process includes correcting information obtained during the presuming based on the obtained movement information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 is a diagram illustrating an example of a first method for the predicted-region presuming process;

FIG. 19 is a diagram illustrating an example of a second method for the predicted-region presuming process;

FIG. 20 is a diagram illustrating an example of a third method for the predicted-region presuming process;

DESCRIPTION OF EMBODIMENTS

Figure 1:
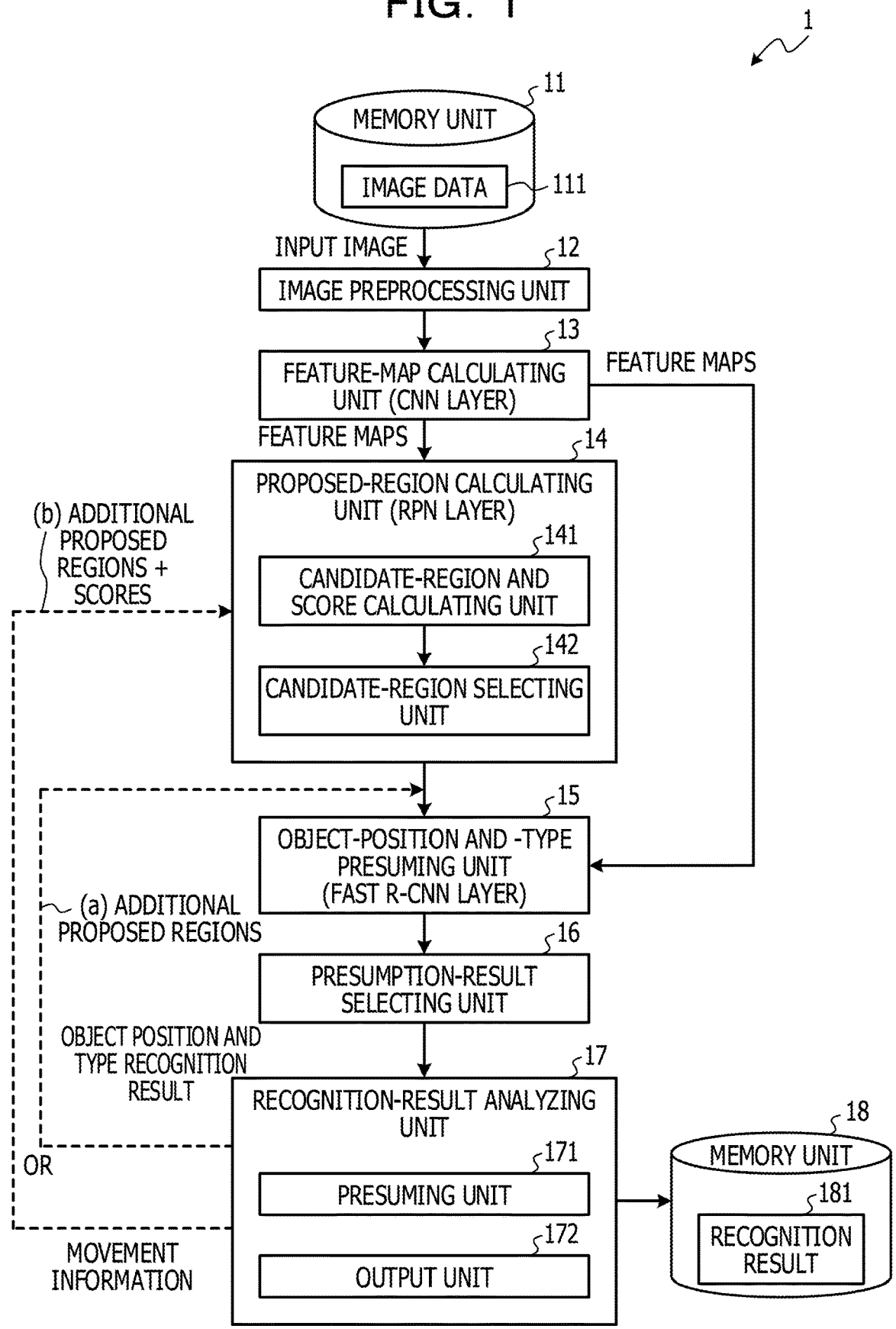
FIG. 1 is a block diagram illustrating a configuration example of a detecting apparatus according to an embodiment of the present disclosure.

However, with the method for tracking the motion of an object based on the detected position of the object specified in each still image, there may be a case where the candidate position of the target object is not accurately presumed, and the object is not accurately detected. One example of the case where the candidate position of the target object is not accurately presumed is a case where the target object is hidden by another object in a certain still image. Another example is a case where the score of the object is estimated low because of the positional relationship between the presumed candidate position of the object and the reference region serving as a basis for score calculation.

In one aspect, the present disclosure is directed to improve the accuracy of detection of object position in the process for detecting object position using a neural network.

Embodiments of the present disclosure will be described hereinbelow with reference to the drawings. However, the following embodiments are given for mere illustrative purposes and are not intended to exclude various modifications and applications of the technique that are not explicitly described below. For example, the embodiments can be variously modified without departing from the spirit. Parts given the same reference signs in the drawings used in the following description designate like or corresponding parts unless otherwise specified.

[1] Embodiments

[1-1] Configuration Example

A detecting apparatus 1 according to an embodiment (see FIG. 1) presumes at which position in the image or image sequence what object is present using a neural network (hereinafter sometimes referred to as "NN"). In one example, the detecting apparatus 1 may be implemented by a computer system including one or more computers. Examples of the computer include a server, a personal computer (PC), and other various information processing units.

As illustrated in FIG. 1, the detecting apparatus 1 according to an embodiment may include memory units 11 and 18, an image preprocessing unit 12, a feature-map calculating unit 13, a proposed-region calculating unit 14, an object-position and -type presuming unit 15, a presumption-result selecting unit 16, and a recognition-result analyzing unit 17.

The detecting apparatus 1 according to an embodiment is capable of recognizing and tracking an object that is moving across an image sequence, for example, a plurality of images (which may also be referred to as "frames") arranged in time series, such as a moving image, using a method described later. In the following description, the image preprocessing unit 12, the feature-map calculating unit 13, the proposed-region calculating unit 14, the object-position and -type presuming unit 15, the presumption-result selecting unit 16, and the recognition-result analyzing unit 17 perform the process for each frame in the image sequence.

The memory units 11 and 18 store various items of data. For example, the memory unit 11 may store image data 111 (for example, data on the image sequence), which is an example of data input to the detecting apparatus 1, and the memory unit 18 may store a recognition result 181, which is an example of data output from the detecting apparatus 1. The memory units 11 and 18 may be implemented by at least part of a storage area, such as a memory or a storage device, of the hardware of the computer operating as the detecting apparatus 1. The memory units 11 and 18 may be integrally managed as a single memory unit.

The image preprocessing unit 12 obtains input images one image (frame) at a time from the image data 111 in the memory unit 11 and preprocesses the input images. The preprocessing may include changing the size, changing the pixel value, and correcting the luminance for changing each input image to an image suitable for subsequent processing.

In changing the size, the image preprocessing unit 12 may perform a resizing process for setting the image size to be input to the feature-map calculating unit 13 such that, for example, the short side of the image is 600 pixels in length and the long side is 1,000 pixels or less in length. In changing the pixel value, the image preprocessing unit 12 may perform a changing process for changing the value of each pixel to, for example, 32-bit floating point. In correcting the luminance, the image preprocessing unit 12 may my perform a process for subtracting a predetermined value (for example, 122.77, 115.95, or 102.98) from the average luminance of the red, green, and blue (RGB) values of the input images.

The processes performed by the image preprocessing unit 12 are not limited to the above processes and may be variously modified according to the specifications of a CNN layer 130 (see FIG. 2) of the feature-map calculating unit 13 and so on. The input images preprocessed by the image preprocessing unit 12 are input to the feature-map calculating unit 13.

The feature-map calculating unit 13 inputs the input images to the CNN layer 130 and outputs feature maps, which are an example of an image feature amount indicating the features of the input images.

The CNN layer 130 is an example of a NN including a plurality of processing layers. One nonrestrictive example of the CNN layer 130 is a visual geometry group (VGG) 16.

The CNN layer 130 analyzes input images (also referred to as "input data") by learning of the NN based on the input images and extracts and outputs the feature maps of the input images. The feature maps output from the CNN layer 130 are input to the proposed-region calculating unit 14 and the object-position and -type presuming unit 15. Together with the feature maps, the input images may be input from the feature-map calculating unit 13 to one or both of the proposed-region calculating unit 14 and the object-position and -type presuming unit 15.

Figure 2:
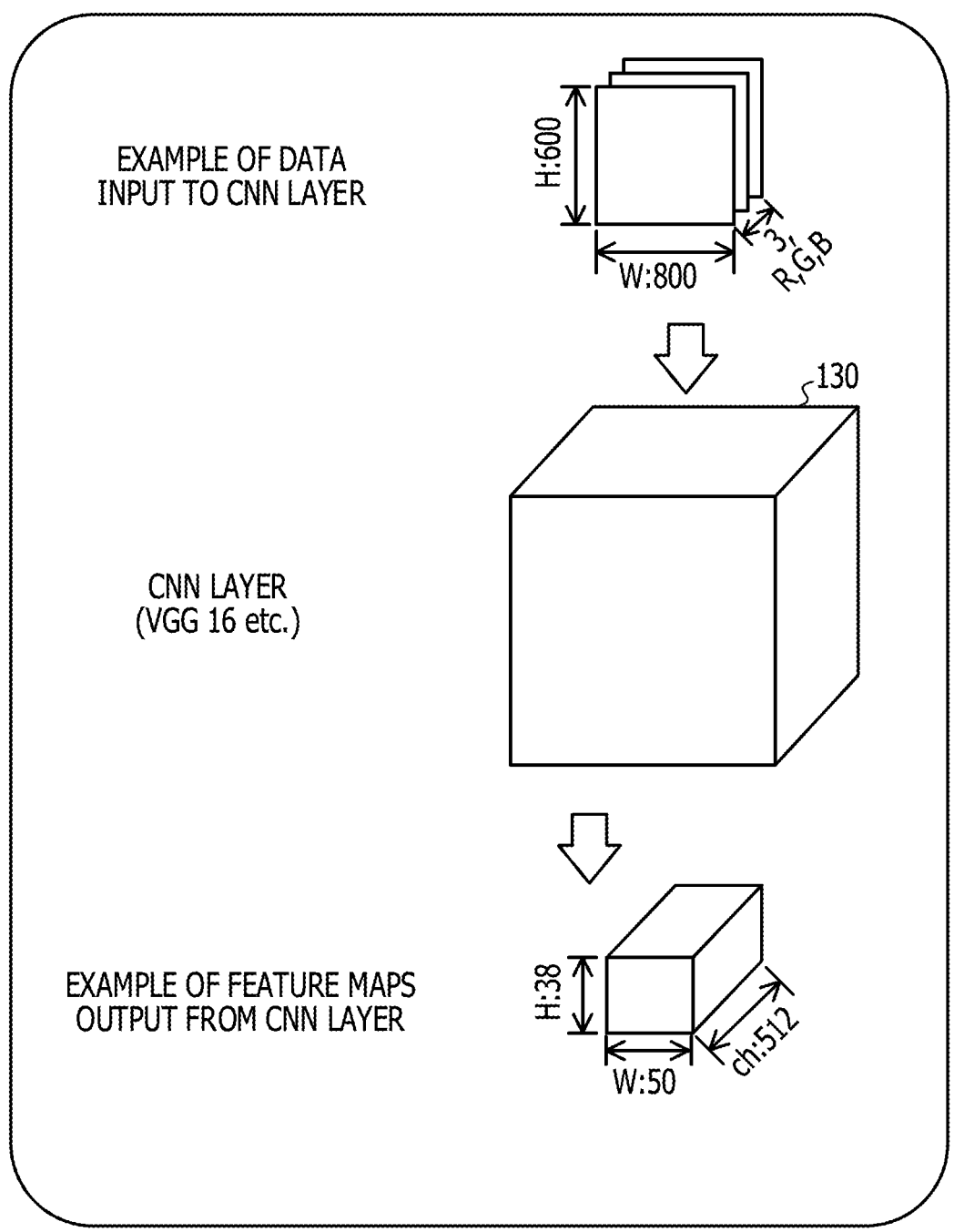
FIG. 2 is a diagram illustrating an example of data that is input to and output from a feature-map calculating unit.

In the example in FIG. 2, RGB (three-channel) image data with 600 pixels in height and 800 pixels in width preprocessed by the image preprocessing unit 12 is input as the input data to the CNN layer 130.

For example, the CNN layer 130 outputs 512-channel feature maps with 38 pixels in height and 50 pixels in width with respect to the input data described above. The feature maps may include information indicating one feature per channel.

The CNN layer 130 illustrated in FIG. 2 is assumed to be relu5_3 layer of VGG16. In this case, the CNN layer 130 includes four pooling layers that reduce the size of one side of the feature maps to one half, so that the height and width of the feature maps are reduced to one sixteen of the height and width of the input images.

Since the CNN layer 130 can be implemented by known various techniques, the details of the processing and learning methods of the CNN layer 130 will be omitted.

Thus, the feature-map calculating unit 13 obtains the feature amount of the input images based on the input images that are sequentially input from the image sequence.

The proposed-region calculating unit 14 inputs the feature maps obtained from the CNN layer 130 to a region proposal network (RPN) layer 140 (see FIG. 3) and outputs proposed regions, which are examples of a candidate position at which an object is present.

Figure 3:
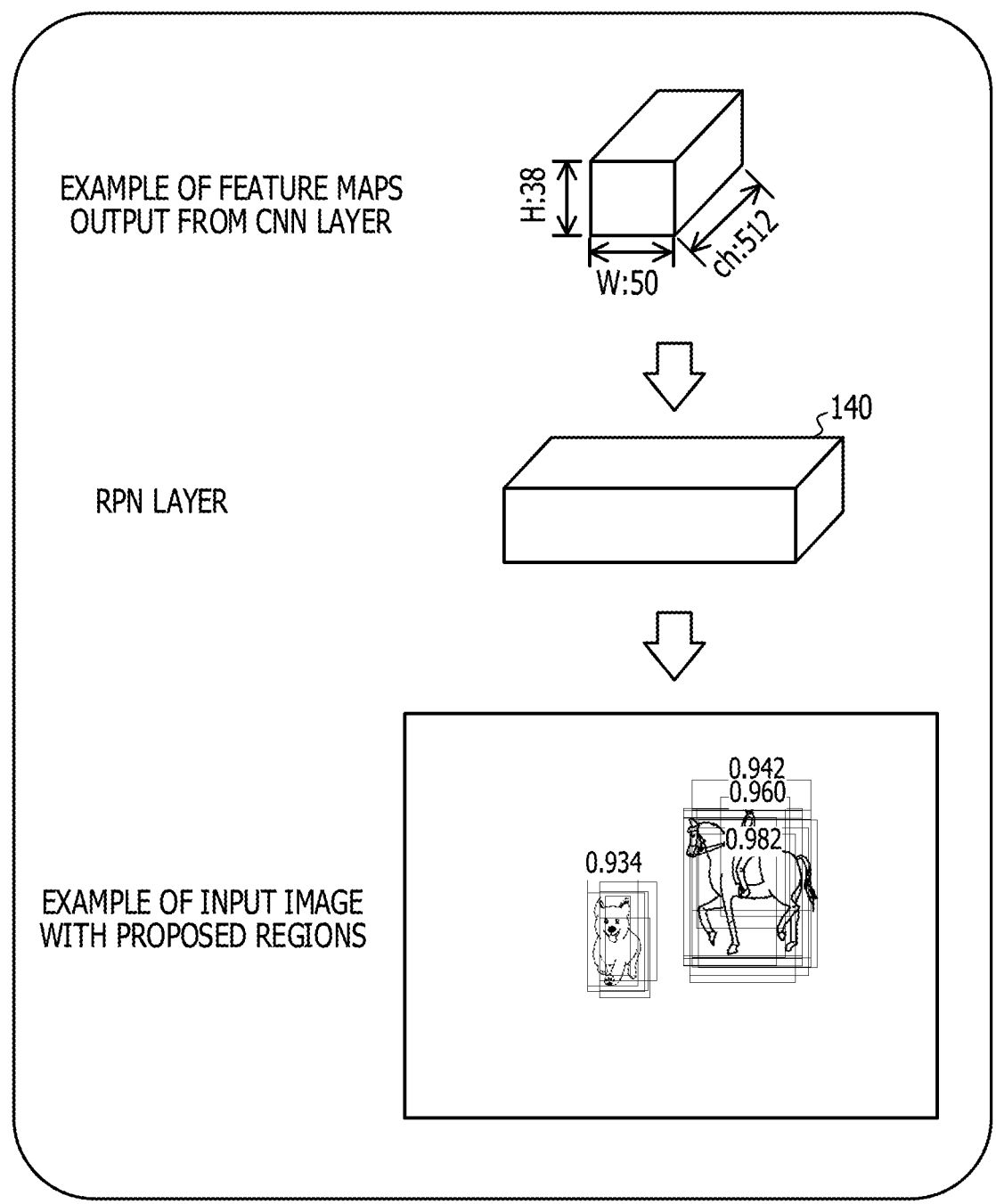
FIG. 3 is a diagram illustrating an example of data that is input to and output from a proposed-region calculating unit.

The RPN layer 140 is one example of a NN including a plurality of processing layers. As illustrated in FIG. 3, the RPN layer 140 analyzes the feature maps to calculate the proposed regions of the feature maps, and outputs the analysis. The proposed regions are examples of candidate regions where an object can be present. The proposed regions output from the RPN layer 140 are input to the object-position and -type presuming unit 15. Together with the proposed regions, the input images may be input from the proposed-region calculating unit 14 to the object-position and -type presuming unit 15.

In the example in FIG. 3, feature maps with 38 pixels in height and 50 pixels in width, and 512 channels, extracted by the feature-map calculating unit 13 are input as the data to be input to the RPN layer 140.

For example, the RPN layer 140 may output input images with proposed regions as the above input data. The data output from the RPN layer 140 may be limited to information on proposed regions containing no input image.

Although the example in FIG. 3 uses rectangular regions as the proposed regions, this is given merely for illustrative purposes; various shapes, such as an elliptical shape, may be employed.

The proposed regions may include "score" indicating the probability of presence of an object in the regions. In the example in FIG. 3, the score is expressed as a three-digit number after the decimal point (the greater the value, the higher the probability), with "1.000" as the maximum value. The number of proposed regions output from the RPN layer 140 may be limited to proposed regions whose scores have a predetermined numerical value (for example, a numerical value of "0.800" or greater). In FIG. 3, only part of all the proposed regions are given scores for easy viewing of the drawing. The number of proposed regions output from the RPN layer 140 may be limited to a predetermined number (for example, 150).

As illustrated in FIG. 1, the proposed-region calculating unit 14 may include a candidate-region and score calculating unit 141 and a candidate-region selecting unit 142 by way of example.

The candidate-region and score calculating unit 141 calculates the proposed regions including scores described above.

The candidate-region selecting unit 142 narrows down the number of proposed regions, calculated by the candidate-region and score calculating unit 141, to a predetermined number. In one example, the candidate-region selecting unit 142 may execute a non-maximum suppression (NMS) process for selecting regions with less overlap in descending order of score.

The proposed-region calculating unit 14 (the candidate-region and score calculating unit 141 and the candidate-region selecting unit 142) presumes proposed regions using reference regions (referred to as "anchor") fixedly disposed in the input image. For example, the proposed-region calculating unit 14 may presume presence/absence of an object in each anchor region or a region formed of a combination of a plurality of anchors, the size of a region in which the object is present, and its score based on the feature maps.

Figure 4:
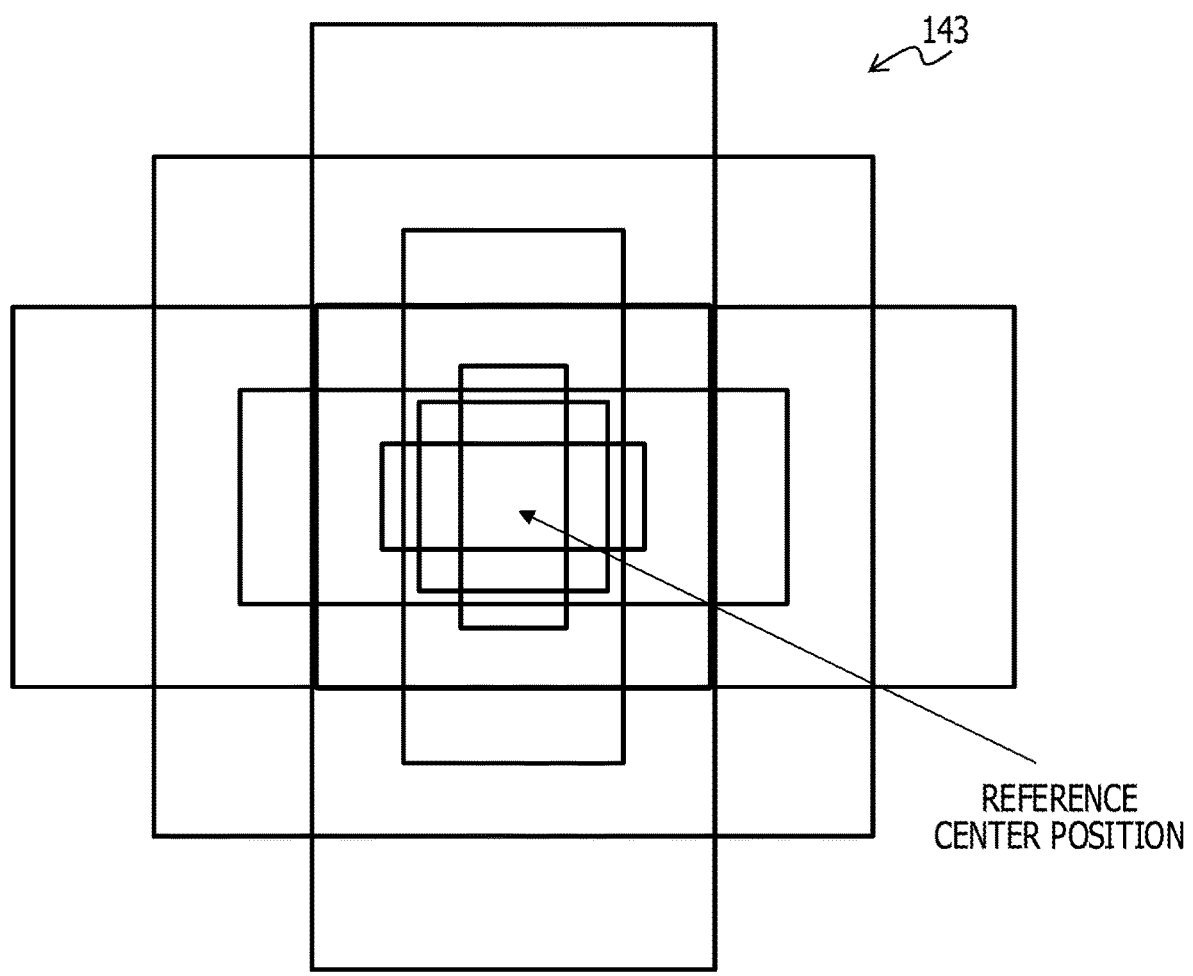
FIG. 4 is a diagram illustrating an example of a group of anchors.
Figure 5:
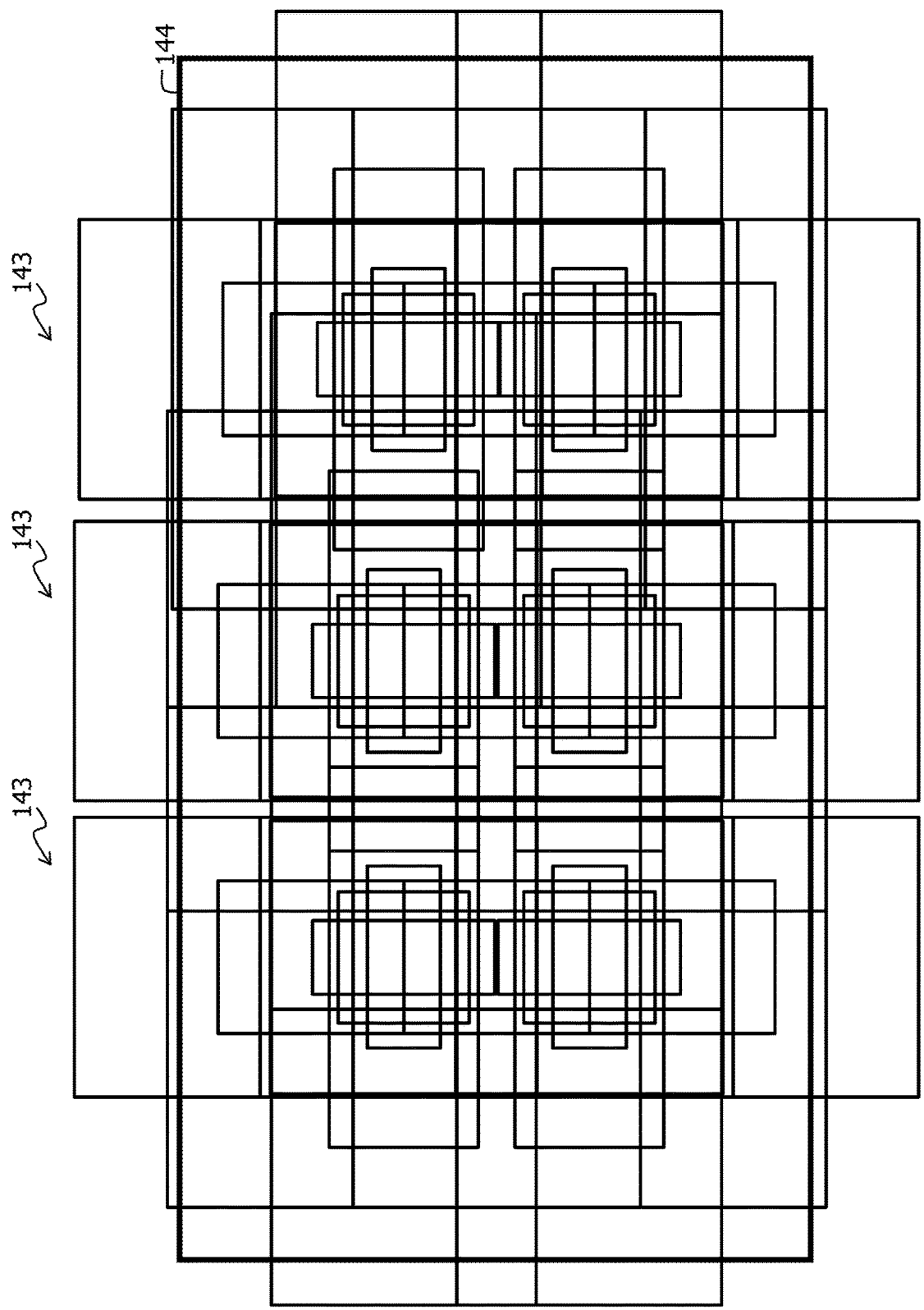
FIG. 5 is a diagram illustrating an example of a plurality of groups of anchors disposed in an image.

In an example, as illustrated in FIG. 4, a group of anchors 143 may include K (=9) anchors centered on a common position (a reference center position). In an embodiment, as illustrated in FIG. 5, a group of anchors 143 are disposed over an image 144 at a certain interval (for example, 16 pixels by default). For example, in the case of an image 144 with a height of 600 pixels and a width of 800 pixels, nine anchors with its reference center position at a position indicated by H (the number of heightwise divisions: for example, 38)×W (the number of widthwise divisions: for example, 50) are disposed at each position. Thus, the proposed-region calculating unit 14 may use H×W×K anchors. The example in FIG. 5 illustrates anchors with H:2, W:3, K:9 for simplifying the drawing.

Although the examples in FIG. 4 and FIG. 5 use rectangular regions as anchors, the present disclosure is not limited thereto. Various shapes such as an elliptical shape may be used.

Since presumption of proposed regions using the RPN layer 140, the NMS process, and anchors can be implemented by various known techniques, the details will be omitted.

Figure 6:
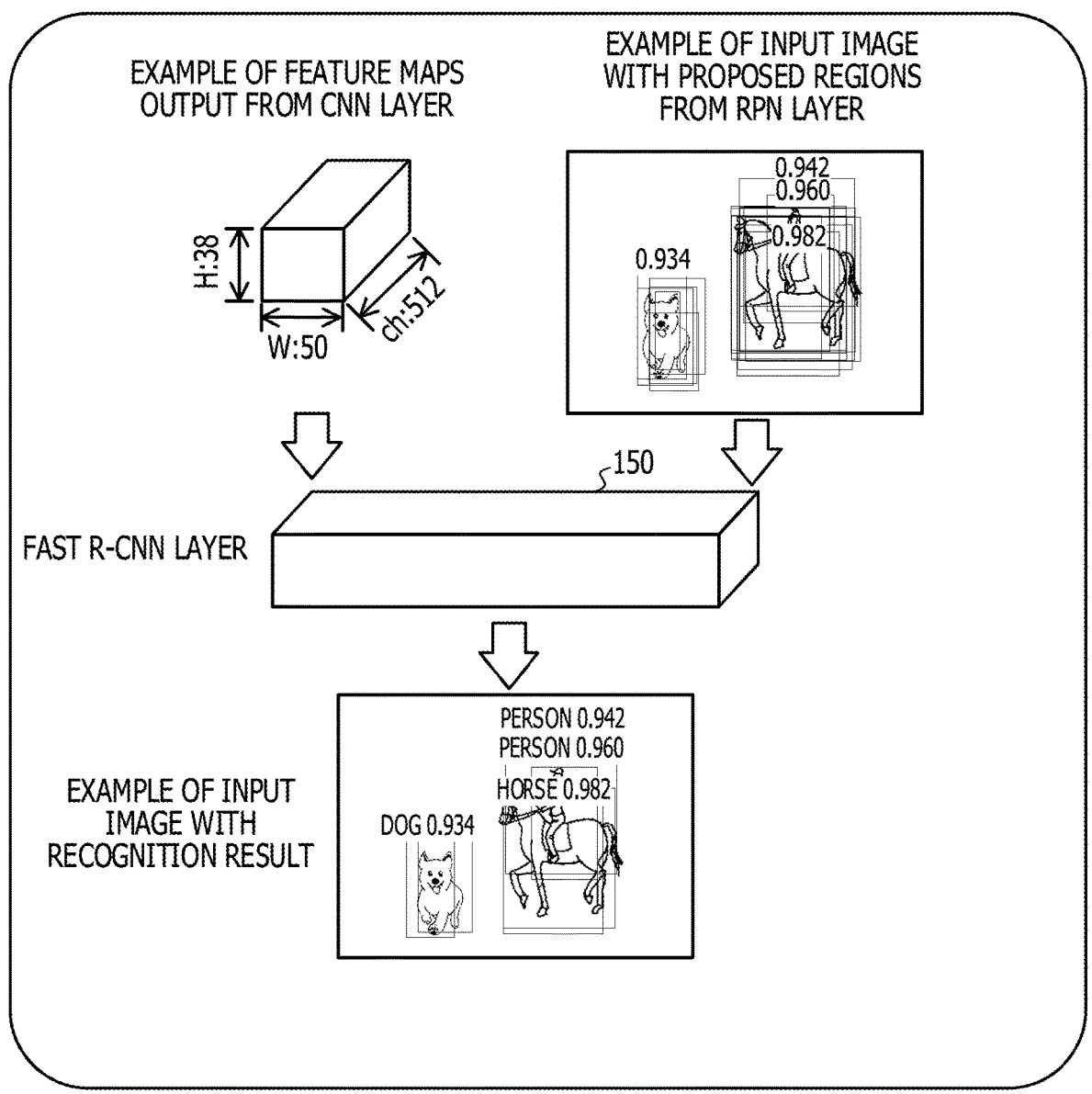
FIG. 6 is a diagram illustrating an example of data that is input to and output from an object-position and -type presuming unit.

The object-position and -type presuming unit 15 inputs the feature maps obtained from the CNN layer 130 and the proposed regions obtained from the RPN layer 140 to a Fast R-CNN layer 150 (see FIG. 6). The object-position and -type presuming unit 15 analyzes the proposed regions with higher accuracy and presumes the type of the object based on the input information.

The Fast R-CNN layer 150 is an example of the NN including a plurality of processing layers. As illustrated in FIG. 6, the Fast R-CNN layer 150 outputs the result of presumption indicating what type of object is present in which rectangular region in the image region together with scores based on the feature maps and the proposed regions. The type of the object may be determined by letting the NN learn. The presumption result output from the Fast R-CNN layer 150 is input to the presumption-result selecting unit 16. Together with the presumption result, the proposed regions from the RPN layer 140 may be input from the object-position and -type presuming unit 15 to the presumption-result selecting unit 16.

In the example in FIG. 6, the input data to the Fast R-CNN layer 150 is feature maps with a height of 38 pixels, a width of 50 pixels, and 512 channels, extracted by the feature-map calculating unit 13. The input data to the Fast R-CNN layer 150 is an input image with proposed regions including scores calculated by the proposed-region calculating unit 14.

For the input data, the Fast R-CNN layer 150 may output, for example, the input image with presumption results. The data output from the Fast R-CNN layer 150 may be limited to information on the presumption result without the input image.

In the example in FIG. 6, the input image with presumption result includes proposed regions narrowed from the proposed regions output from the RPN layer 140 according to the scores and the positional relationship with the anchors. The input image with presumption result includes the type of the object presumed (for example, "Person", "Horse", or "Dog") together with scores for the proposed regions.

Since the Fast R-CNN layer 150 can be implemented using various known techniques, the details will be omitted.

Thus, the feature-map calculating unit 13, the proposed-region calculating unit 14, and the object-position and -type presuming unit 15 are examples of a presuming unit that presumes a set of indices indicating candidate regions in which an object is presumed to be present in a first image in an image sequence and the probability of presence of an object in the candidate regions according to the feature amount of the first image. In this case, the candidate-region and score calculating unit 141 of the proposed-region calculating unit 14 performs a first process for presuming a plurality of sets of a candidate region and an index, and the candidate-region selecting unit 142 performs a second process for narrowing down the plurality of sets to a predetermined number of sets based on the individual indices of the plurality of sets. The object-position and -type presuming unit 15 performs a third process for presuming the type of the object that is presumed to be present in the candidate regions based on the predetermined sets of a candidate region and an index and the feature amount of the image.

Figure 7:
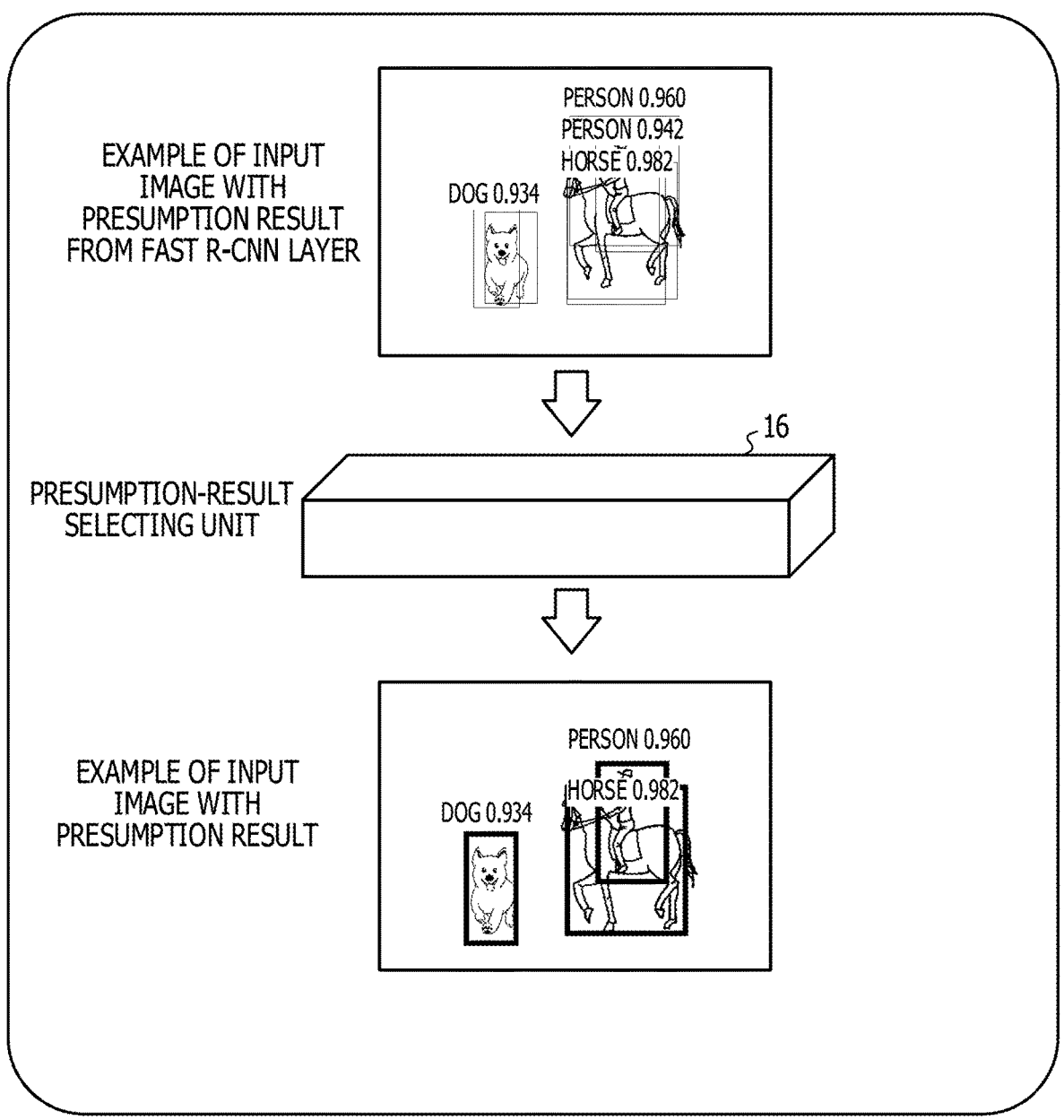
FIG. 7 is a diagram illustrating an example of data that is input to and output from a presumption-result selecting unit.

As illustrated in FIG. 7, the presumption-result selecting unit 16 narrows down the positions of the each type of object from the presumption results based on the input image with presumption results input from the object-position and -type presuming unit 15 and outputs an input image with the result of recognition of the position and type of the object as a result of narrowing. In the process for narrowing, the presumption-result selecting unit 16 may use the information on proposed regions output from the RPN layer 140. The input image with recognition result output from the presumption-result selecting unit 16 is input to the recognition-result analyzing unit 17.

The presumption-result selecting unit 16 may output information on recognition result without the input image based on the presumption results or the input image with presumption results.

The presumption-result selecting unit 16 may execute the NMS process for selecting regions with less overlap in descending order of score as the proposed-region calculating unit 14 does.

Since the process for narrowing presumption results performed by the presumption-result selecting unit 16 can be implemented using various known techniques, descriptions of the details will be omitted.

Thus, the presumption-result selecting unit 16 is an example of a determination unit that determines the position of an object in a first image using a set of the presumed candidate region and the index.

The feature-map calculating unit 13, the proposed-region calculating unit 14, the object-position and -type presuming unit 15, and the presumption-result selecting unit 16 function as a Faster R-CNN. The Faster R-CNN allows high-speed recognition (detection) of what type of object among the types learned by the NN is present in which rectangular region in the input image using a weight learned by the NN using training data.

The recognition-result analyzing unit 17 analyzes the recognition result (or the input image with recognition result) input from the presumption-result selecting unit 16 and increases the presumption accuracy of the position and type of the object in the next frame and subsequent frames in the Faster R-CNN. In other words, the recognition-result analyzing unit 17 analyzes the recognition results (or the input image with recognition results) of the past frames and improves the presumption accuracy of the position and the type of an object in the present input image in the Faster R-CNN. For that purpose, the presumption-result selecting unit 16 may include a storage unit for storing and accumulating the presumption results of the past several frames or analysis results of the presumption results. The storage unit may be implemented by at last part of the memory or the storage area of the memory unit of the detecting apparatus 1. The recognition-result analyzing unit 17 may store and accumulate the recognition result from the presumption-result selecting unit 16 in the memory unit 18 as a recognition result 181.

In one example, the recognition-result analyzing unit 17 may calculate movement information indicating the moving position of the object in the present frame based on the recognition result of the past frames and provides the calculated movement information to the Faster R-CNN. The movement information is information on the object position in the present frame presumed from the recognition result of the past frames.

A first example of the movement information is a predicted region indicating the predicted position of the object in the present frame. The predicted region may be placed as an additional proposed region and may have the same data structure as the data structure of the proposed regions. The predicted region may include the score of the predicted region.

In the first example, the movement information may be provided for the section from the proposed-region calculating unit 14 to the object-position and -type presuming unit 15 as indicated by sign (a) in FIG. 1. In one example, the movement information may be input to the object-position and -type presuming unit 15 together with the proposed regions output from the proposed-region calculating unit 14.

A second example of the movement information is correction information for increasing the score of a proposed region of the proposed regions output from the proposed-region calculating unit 14 close to the predicted region (for example, a region with large overlap). Examples of the correction information include the corrected score itself of the proposed region and a weighing factor for making the score higher than the scores of the other proposed regions.

In the second example, the movement information may be provided to the proposed-region calculating unit 14, as indicated by sign (b) in FIG. 1. In one example, the movement information may be input to the candidate-region selecting unit 142 of the proposed-region calculating unit 14. For example, the movement information may be input to the NMS process of selecting regions with less overlap in the descending order of score in the candidate-region selecting unit 142.

Instead of the correction information, the movement information in the second example may include the predicted region in the first example and the correction information for increasing the score of the predicted region.

As described above, the recognition-result analyzing unit 17 is an example of an acquisition unit that acquires movement information on the movement of the object from the image sequence. For example, the recognition-result analyzing unit 17 obtains movement information based on the temporal change of the position of an object that is recognized as the same object based on the position of the object determined for each of a plurality of images temporally earlier than the first image in the image sequence. The proposed-region calculating unit 14 and the object-position and -type presuming unit 15, which are examples of the presuming unit, correct the information obtained in the process of presumption based on the acquired movement information.

Thus, the recognition-result analyzing unit 17 can presume the predicted region (for example, the rectangular region) of an object that is moving in the moving image from the past image sequence data and can use the predicted region in the processing in the Faster R-CNN. This increases the accuracy of detecting the position of the object in the process for detecting the object position using a neural network.

The calculation with the Faster R-CNN is for still images, as described above. In other words, the Faster R-CNN is a technique proposed as a NN for object detection in still images.

Therefore, in the related technique (a technique for tracking the motion of an object specified in each still image from the detected position of the object, the Faster R-CNN is executed as a process independent of the tracking process for a moving person. In other words, in object detection using the Faster R-CNN, the calculation result obtained by the tracking process is not used in the processing in the Faster R-CNN.

Specifically, the above related technique includes processing for repeatedly presuming "pedestrian" and "the position of the pedestrian (for example, a rectangular region)" and processing for tracking based on the obtained presumption results using the Faster R-CNN. However, the processing in the Faster R-CNN has not been changed.

In contrast, the recognition-result analyzing unit 17 makes use of the information on the predicted region that can be presumed from the motion of the object, in other words, the result of tracking, to increase the accuracy of object detection and tracking.

Thus, the information on the still image and the information on the predicted region obtained by tracking a moving object are different in terms of quality. Using the quantitatively different information improves the accuracy of object detection for a moving image.

Furthermore, labeling learning data for object detection in the NN takes much time and labor. In contrast, the Faster R-CNN allows recognizing that an object moving among frames is the same object by using movement information from the recognition-result analyzing unit 17. This allows attaching the same learning data label (for example, the type of the object) to objects having continuity among frames.

Furthermore, even if an object enters behind an obstacle (for example, a tree) in a certain frame, so that part is hidden, the recognition-result analyzing unit 17 can presume a predicted region by using the information on the position and the type of the object presumed from the past recognition result. Thus, a region that is not proposed as a proposed region in a still image is proposed as a predicted region using movement information, allowing recognizing the moving object.

The use of the information on the predicted region also for an object that has moved far away and is expressed only by coarse pixel information increased the recognition accuracy of the Faster R-CNN.

Furthermore, in the detecting apparatus 1, the candidate-region and score calculating unit 141 calculates object candidate regions (proposed regions) with scores using a Faster R-CNN that has completed learning. Thereafter, the candidate-region selecting unit 142 executes a process of selecting overlapping regions having close scores in order of score to remove regions having a large overlap with the selected region using the NMS process.

At that time, there may be a case where a plurality of regions with almost the same score overlap with one another. For example, among overlapping proposed regions, a region with a score of 0.995 and a region with a score of 0.99 are accidentally given those scores due to the arrangement of the anchors. For example, those scores can be actually opposite.

In another example, because of the arrangement of the anchors (the arrangement of the center position of the anchors and the nine anchors prepared in advance), not the information on the scores assigned to the regions, the candidate regions of a target object do not accidentally come up to the candidates.

Also in the above cases, the recognition-result analyzing unit 17 can use information on a predicted region in the latest frame presumed from the past presence information on a moving object as well as independently executing the process of the Faster R-CNN for each frame of a still image. This increases the accuracy of object detection and tracking.

[1-2] Description of Recognition-Result Analyzing Unit

The details of the recognition-result analyzing unit 17 will be described hereinbelow.

The recognition-result analyzing unit 17 presumes the predicted region of an object moving in a moving image from past image sequence data and uses the predicted region for processing in the Faster R-CNN to increase the presumption accuracy of the type and the position of the object using the Faster R-CNN, as described above.

In an example, the recognition-result analyzing unit 17 may include a presuming unit 171 and an output unit 172, as illustrated in FIG. 1.

The presuming unit 171 presumes the predicted region (also referred to as "predicted presence region") in the latest frame based on the recognition result of the Faster R-CNN in the past frames. The presuming unit 171 may presume the predicted presence region and obtain its score or the factor of the score.

The predicted presence region may be expressed as (x, y, w, h) in which the predicted presence position (x, y) and the predicted presence region (w, h) of the object are combined, where x is the position of the representative point (for example, the center point) of the rectangular region in the vertical direction (a first direction) in the image, y is the position of the representative point of the rectangular region in the lateral direction (a second direction perpendicular to the first direction) in the image, w is the height (length) of the rectangular region in the vertical direction (the first direction), and h is the height (length) of the rectangular region in the lateral direction (the second direction).

Figure 8:
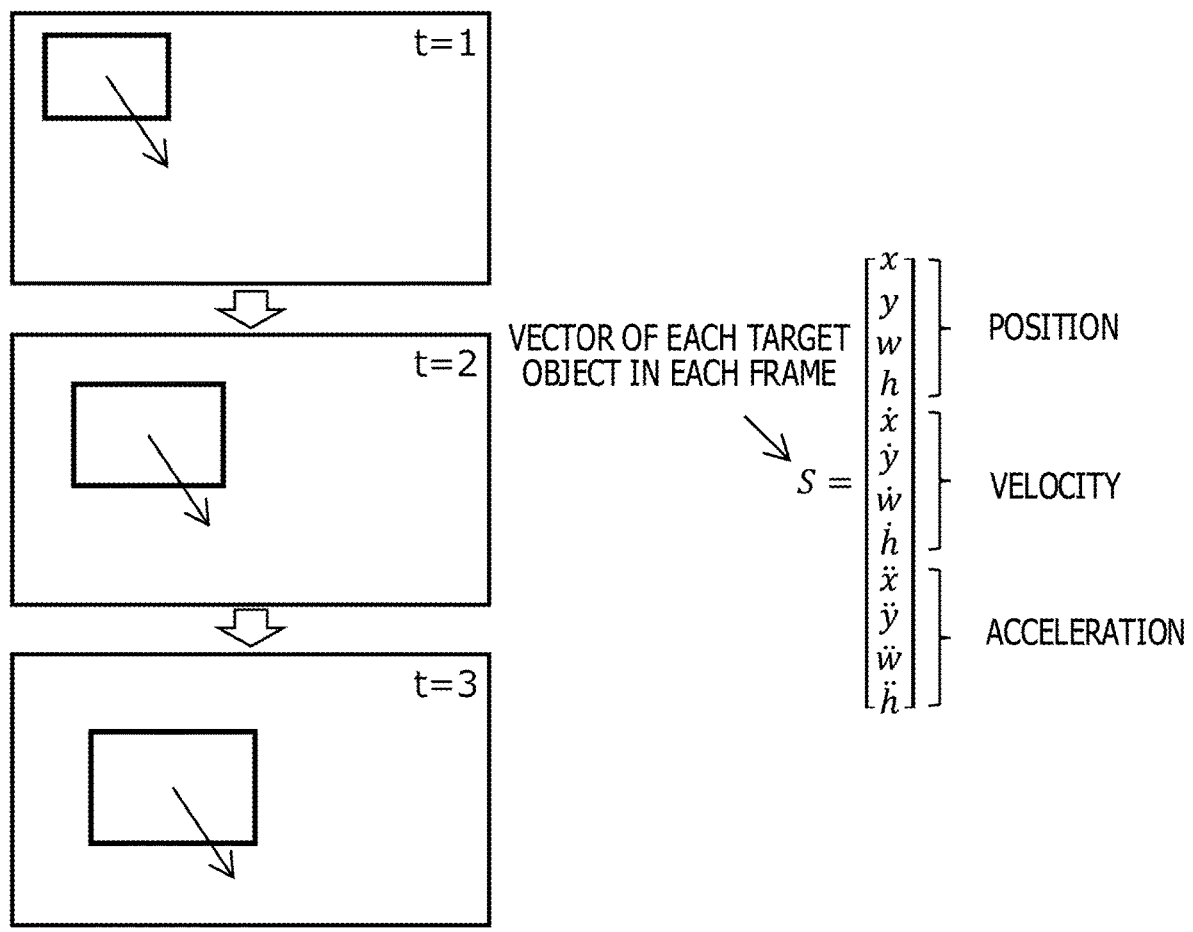
FIG. 8 is a diagram illustrating an example of a predicted-region presuming process performed by a recognition-result analyzing unit.

As illustrated in FIG. 8, in detecting and tracking a moving object whose size changes, the presuming unit 171 may presume the predicted presence region of the object from the past image sequence data using a tracking filter, such as a Kalman Filter. The predicted presence region of the object may be determined by calculating the vector S of each frame and each target object.

The presuming unit 171 can also presume region parameters other than the rectangular region. In other words, when the detecting apparatus 1 uses anchors (for example, in an elliptical shape) other than the rectangular region, the presuming unit 171 can determine a predicted presence region according to the shape of the anchors. In the following description, the anchors have a rectangular shape.

The presuming unit 171 may determine a rectangular region in which the target object can be detected next based on the position and the size of the rectangular region, the type of the object (person, vehicle, or horse) presumed first using a common Faster R-CNN, and the frame rate at the observation. The presuming unit 171 may presume the target object of the same type recognized in the determined rectangular region as the same object as the object recognized in the previous frame.

Thus, the presuming unit 171 may obtain the vector S to presume a predicted presence region by specifying the target object for each frame and applying a motion model prepared in advance to each target object. Examples of the motion model include a uniform motion model, an acceleration motion model, and other various motion models.

Instead of the motion model, other methods, such as correlating the pixel values of the image, may be used to determine the predicted presence region of the object. Still another method is using a tracking model that takes account of an unobserved state using data association for associating the tracked object and the detected object, such as multiple hypothesis tracking (MHT).

The details of presumption of the predicted presence region of an object using the presuming unit 171 will be described later.

The output unit 172 outputs movement information to the Faster R-CNN based on the predicted presence region and/or score presumed by the presuming unit 171. The process for outputting the movement information with the output unit 172 may be performed according to the first and second examples of the movement information, described above. In the following example, the memory units 11 and 18 are not illustrated in FIG. 9 and FIG. 11.

First Example

Figure 9:
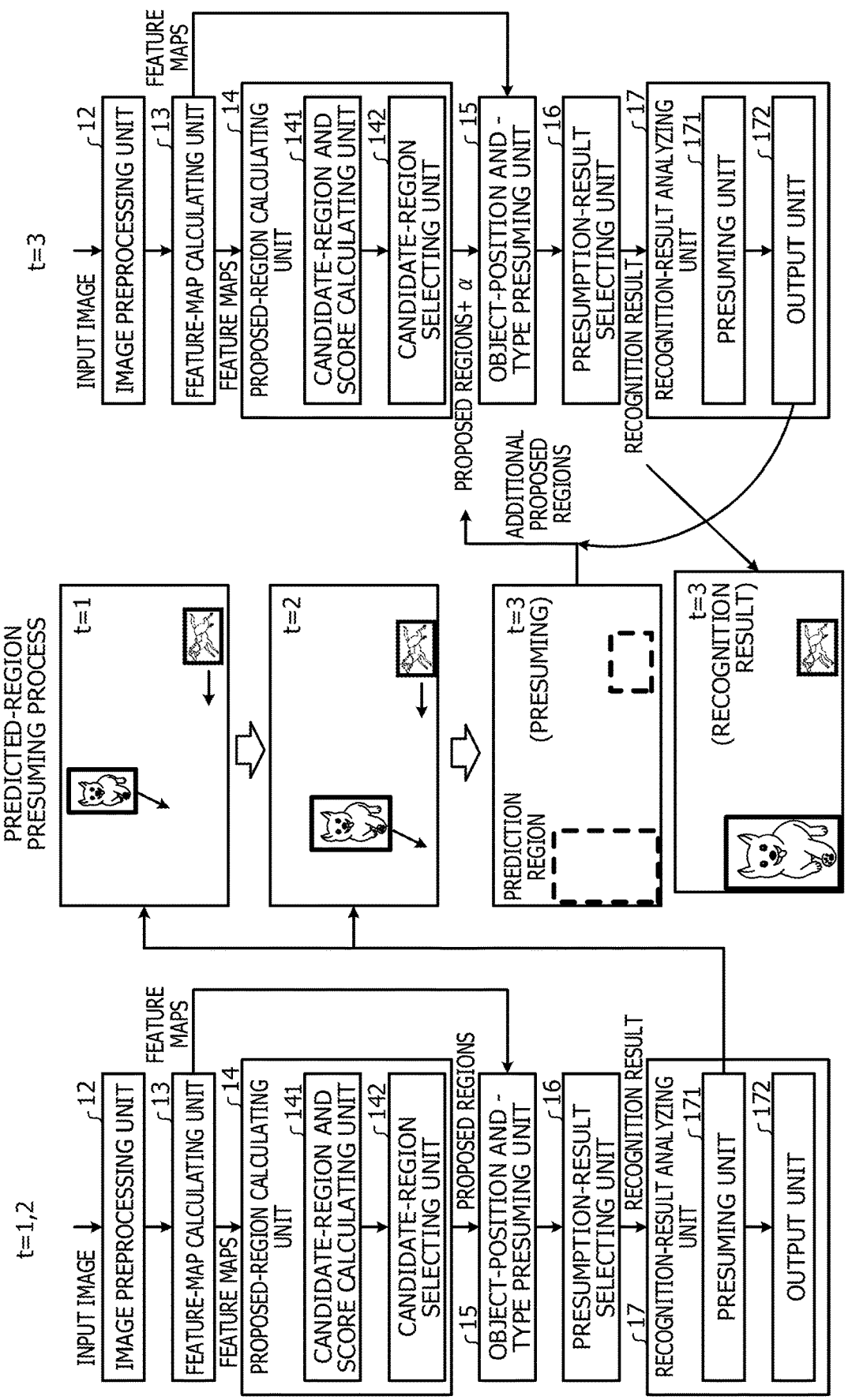
FIG. 9 is a diagram illustrating the predicted-region presuming process in a first example performed by the recognition-result analyzing unit.
Figure 10:
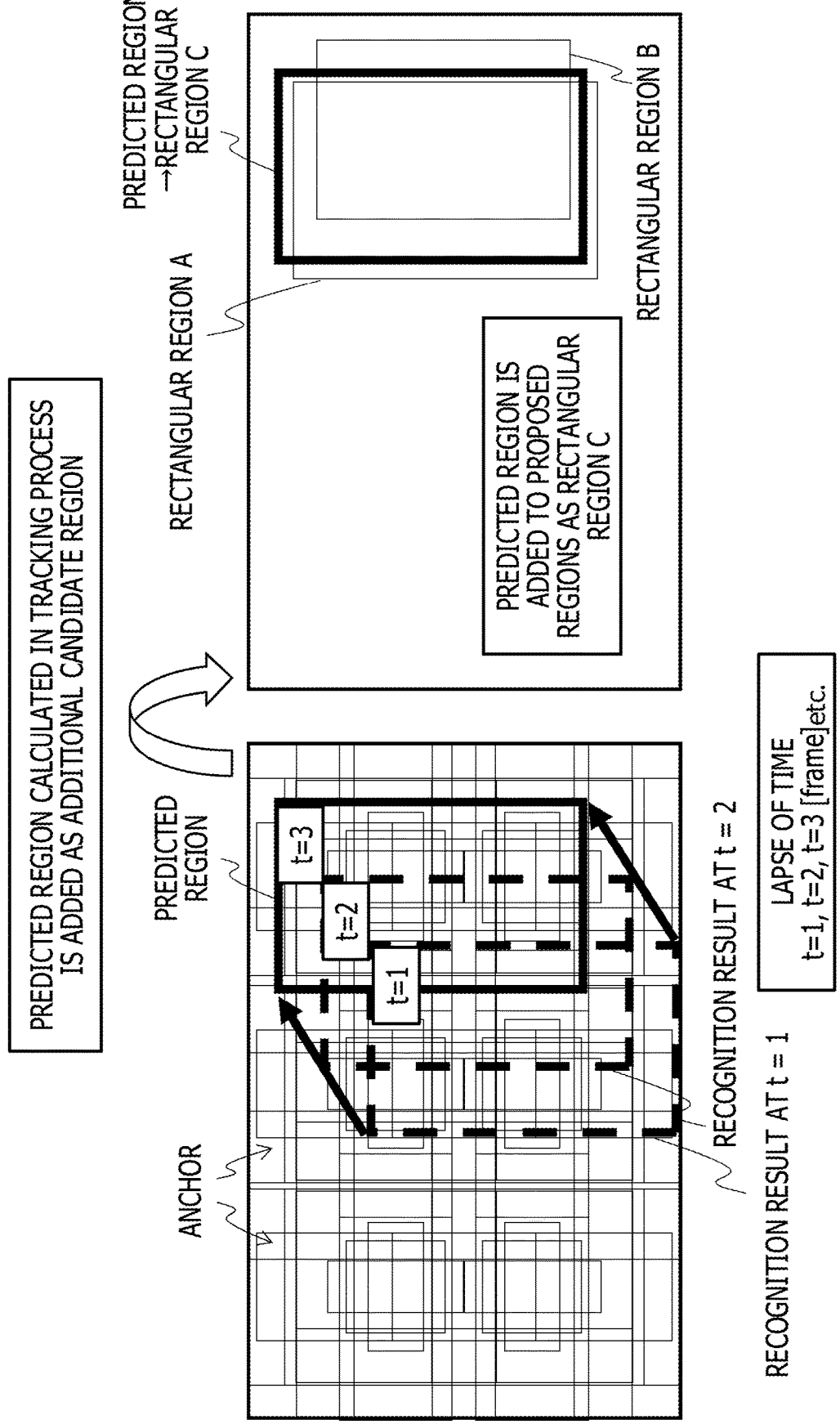
FIG. 10 is a diagram illustrating an example of the predicted-region presuming process in FIG. 9.

As illustrated in FIG. 9 and FIG. 10, at t=3, the output unit 172 may add the information on the predicted presence region at t=3 that the presuming unit 171 presumes, for example, at t=2, based on the positional information and so on at t=1 and t=2 to the result of output from the proposed-region calculating unit 14. For example, the output unit 172 may add the set a of the predicted presence region (additional proposed regions)(x, y, w, h) of each moving object to the proposed regions, which are the result of output from the proposed-region calculating unit 14.

In one example, as illustrated in FIG. 10, the output unit 172 may add the predicted region at t=3 to the proposed regions from the proposed-region calculating unit 14 as a rectangular region C (additional proposed region).

Second Example

Figure 11:
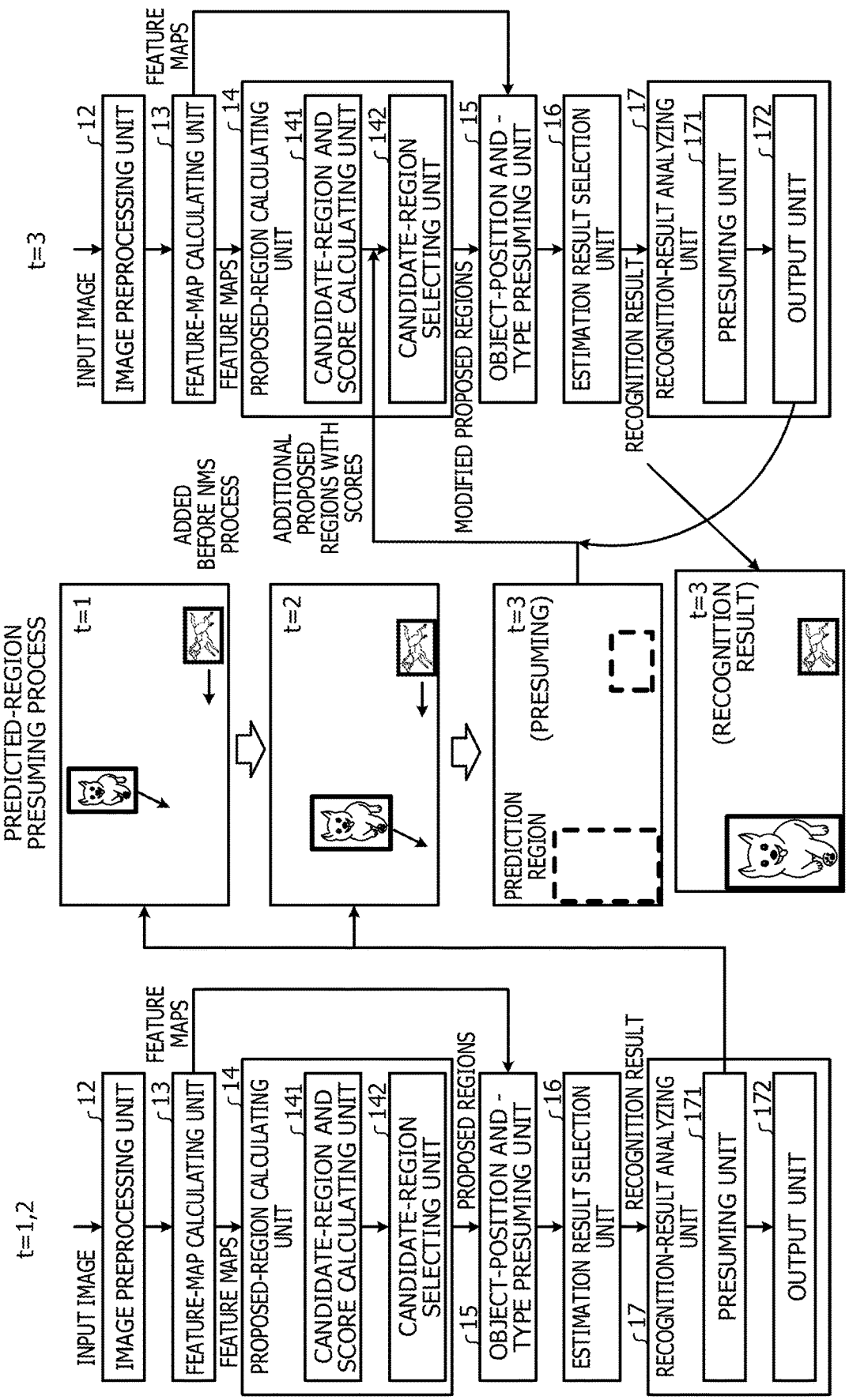
FIG. 11 is a diagram illustrating a predicted-region presuming process in a second example performed by the recognition-result analyzing unit.
Figure 12:
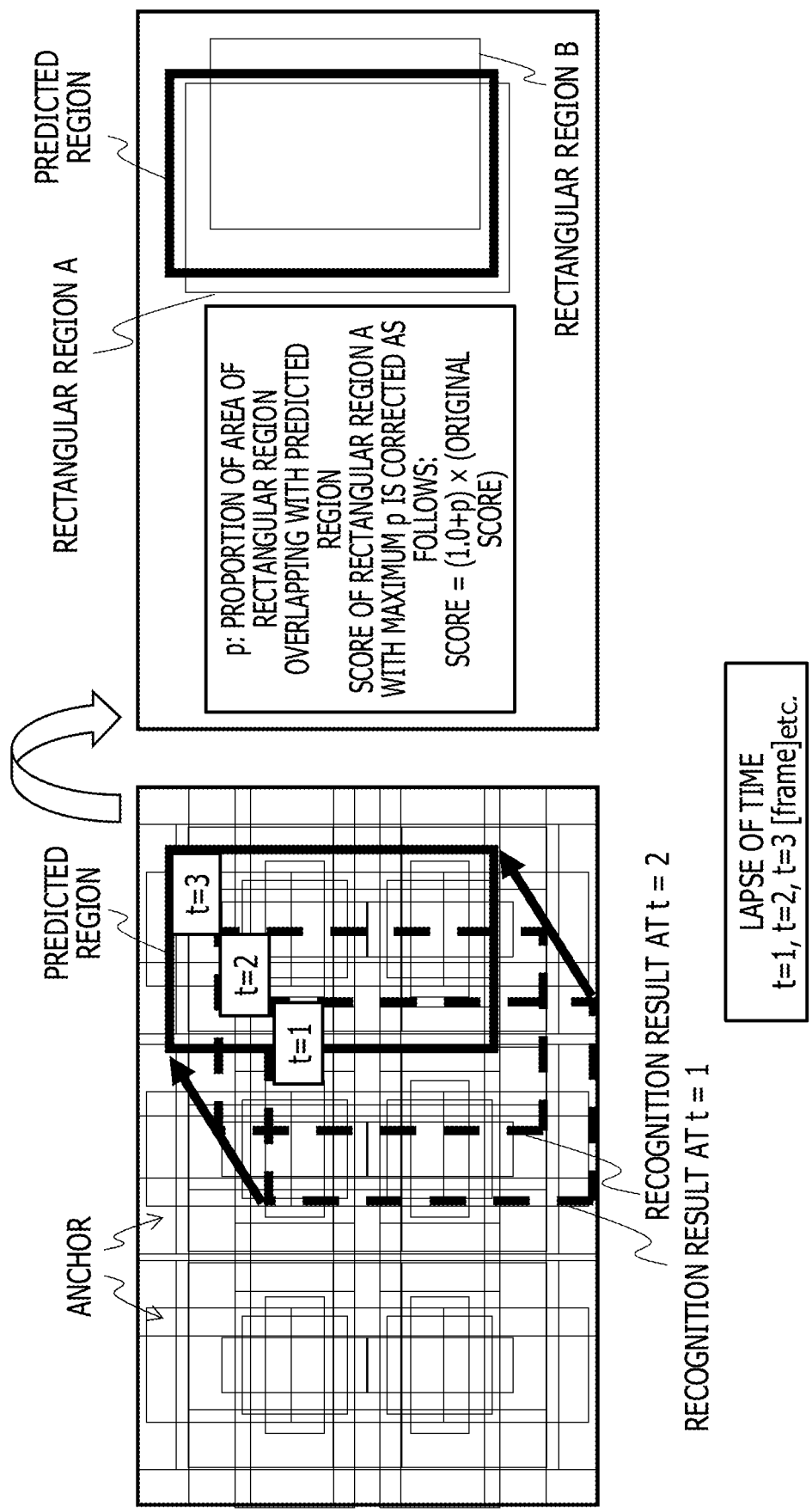
FIG. 12 is a diagram illustrating an example of the predicted-region presuming process in FIG. 11.

As illustrated in FIG. 11 and FIG. 12, at t=3, the output unit 172 may add the information on the predicted presence region at t=3 that the presuming unit 171 presumes, for example, at t=2, based on the positional information and so on at t=1 and t=2 to the result of output from the proposed-region calculating unit 14. For example, the output unit 172 may output correction information for changing the score of the rectangular region in the RPN layer 140 before the NMS process is executed according to the distance between the rectangular region and the predicted presence region to the candidate-region selecting unit 142. The output unit 172 may output the predicted presence region and the correction information for changing the score of the predicted presence region to the candidate-region selecting unit 142.

In one example, as illustrated in FIG. 12, the output unit 172 may output correction information for increasing the score of a candidate region whose position and size are close to the position and size of the predicted region at t=3 to the proposed-region calculating unit 14. An example of the candidate region whose position and size are close to the position and size of the predicted region is a rectangular region (in the example in FIG. 12, a rectangular region A) of which the proportion p of a region of the rectangular region overlapping with the predicted region is the maximum. At that time, the output unit 172 may correct the score of the rectangular region A by multiplying the score of the rectangular region A whose proportion p is the maximum by (1.0+p). The value (1.0+p) is an example of the correction information.

Thus, the recognition-result analyzing unit 17 can increase the recognition accuracy of object detection. The recognition result 181 (see FIG. 1) stored in the memory unit 18 by the recognition-result analyzing unit 17 may be used as labeled learning data in the Faster R-CNN.

As described above, the Faster R-CNN uses proposed regions based on a limited number of anchor positions in presuming the position and type of an object. The technique for presuming proposed regions is unique based on heuristics. For example, the proposed regions can be presumed by disposing anchors with predetermined sizes and aspect ratios at certain pixel intervals and adding a correction value calculated with an NN using a still image as an input to the anchor reference positions.

The calculation of object candidate regions (proposed regions) using the above technique uses only information on a still image. In contrast, the detecting apparatus 1 according to an embodiment uses the object candidate regions (positions, heights, and widths) predicted from the motion of the object, which is information different in quality from the information on the still image, in addition to the proposed regions, thereby increasing the accuracy of object detection.

Figure 13:
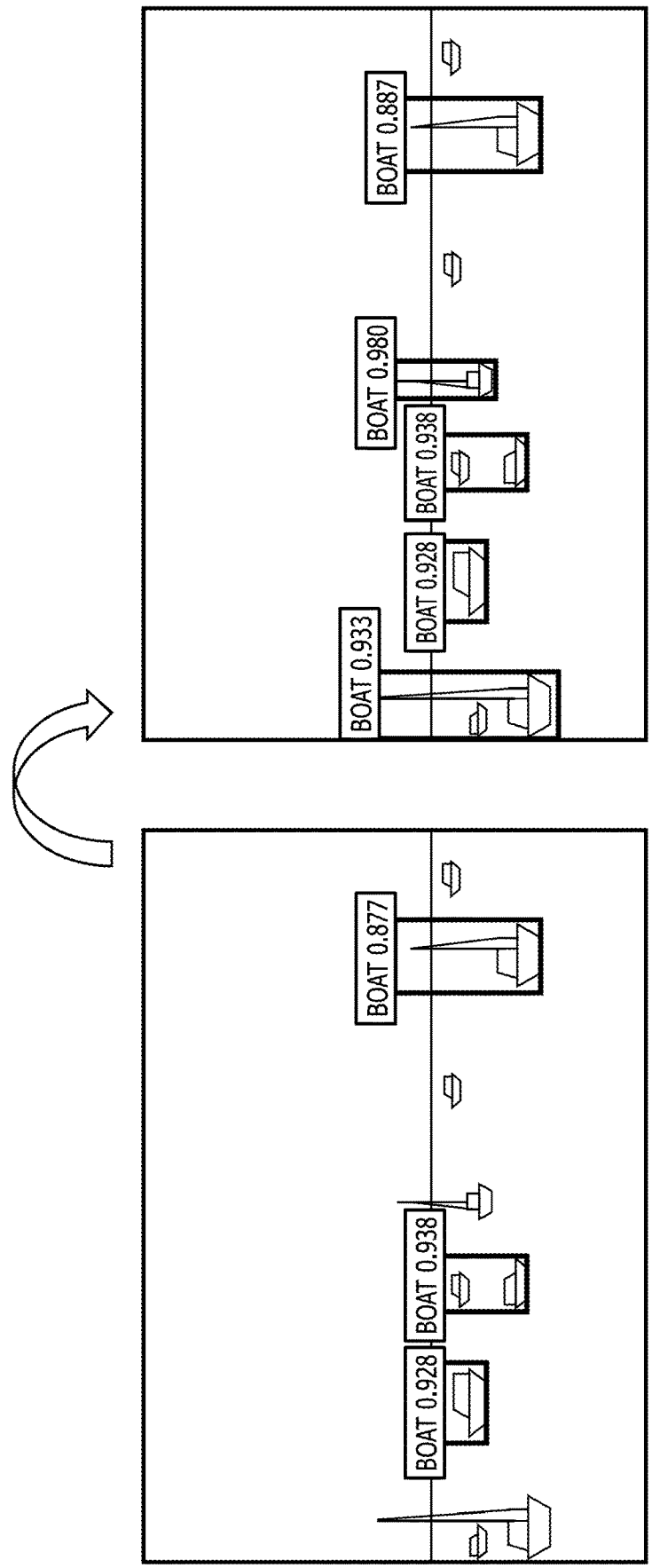
FIG. 13 is a diagram illustrating an example of recognition results before and after movement information is added to Faster R-CNN.

FIG. 13 is a diagram illustrating an example of recognition results before and after movement information is added to the Faster R-CNN in an image in which about six to ten boats are floating in the ocean. FIG. 13 illustrates an example in which additional proposed regions (for example, rectangular regions in which a boat is likely to be actually present), which is one example of the movement information, are added to the proposed regions output from the RPN layer 140, and the results are evaluated.

Thus, boats are newly detected with high scores in the regions in which additional proposed regions are specified (see the right image in FIG. 13). Also when correction information, which is an example of the movement information, is provided to the Faster R-CNN, the same advantageous effect as that in FIG. 13 is expected.

[1-3] Operation Example

Next, an operation example of the detecting apparatus 1 with the above configuration will be described.

First Example

Figure 14:
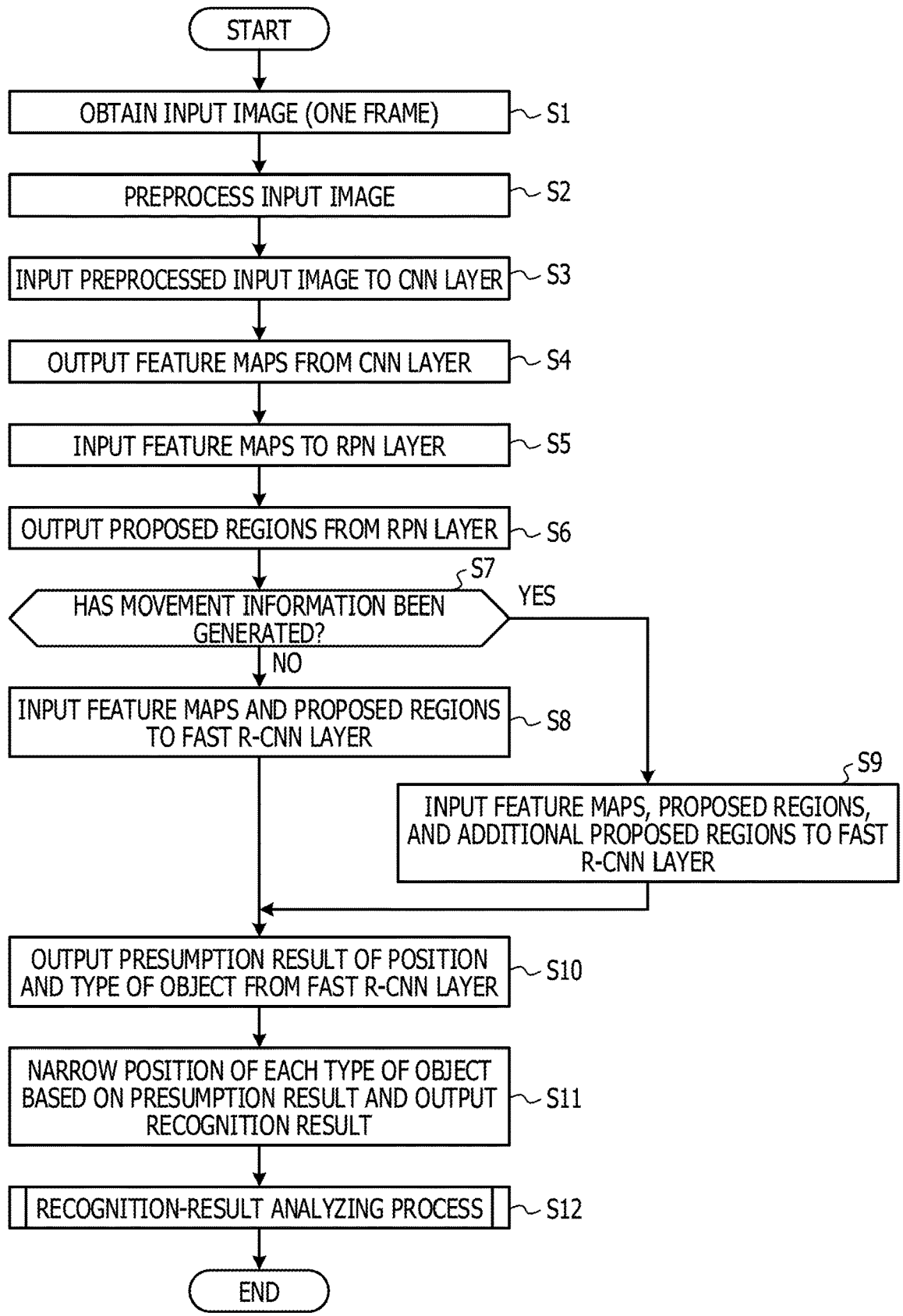
FIG. 14 is a flowchart illustrating an example of a process in the first example performed by the detecting apparatus.

In the first example, as illustrated in FIG. 14, the detecting apparatus 1 obtains one input image (for example, one frame) from the image data 111 (for example, image sequence data) stored in the memory unit 11 (step S1).

The image preprocessing unit 12 preprocesses the input image (step S2). The preprocessing may include changing the size, changing the pixel value, and correcting the luminance for changing the input image to an image suitable for subsequent processing.

The image preprocessing unit 12 inputs the preprocessed input image to the feature-map calculating unit 13 (step S3). The feature-map calculating unit 13 outputs feature maps from the CNN layer 130 (step S4).

The feature-map calculating unit 13 inputs the feature maps to the proposed-region calculating unit 14 (step S5). The proposed-region calculating unit 14 outputs proposed regions from the RPN layer 140 (step S6).

The process branches according to whether movement information is generated from the recognition-result analyzing unit 17 (step S7). If no movement information is generated (step S7: No), the feature maps from the feature-map calculating unit 13 and the proposed regions from the proposed-region calculating unit 14 are input to the object-position and -type presuming unit 15 (step S8). Then, the process goes to step S10.

An example of the case where no movement information is generated is a case where the recognition-result analyzing unit 17 does not perform analysis (for example, there is no past input image). In the example in FIG. 9, this is the case at t=1 or t=2. Another example in which no movement information is generated is a case where no predicted presence region is recognized (for example, there is no object in the past input image).

If movement information is generated (step S7: Yes), the recognition-result analyzing unit 17 inputs a predicted presence region to the object-position and -type presuming unit 15 in addition to the feature maps and the proposed regions (step S9). An example of the predicted presence region is an additional proposed region. Then the process goes to step S10.

In step S10, the object-position and -type presuming unit 15 outputs presumption result of the position and type of the object from the Fast R-CNN layer 150.

The presumption-result selecting unit 16 narrows down the positions by the type of object based on the presumption result from the object-position and -type presuming unit 15, and as a result of narrowing, outputs the results of recognition of the position and type of the object (step S11).

The recognition-result analyzing unit 17 executes a recognition-result analyzing process according to the first example based on the recognition result input from the presumption-result selecting unit 16 (step S12), and the process on one input image (for example, one frame) input in step S1 is completed.

Figure 15:
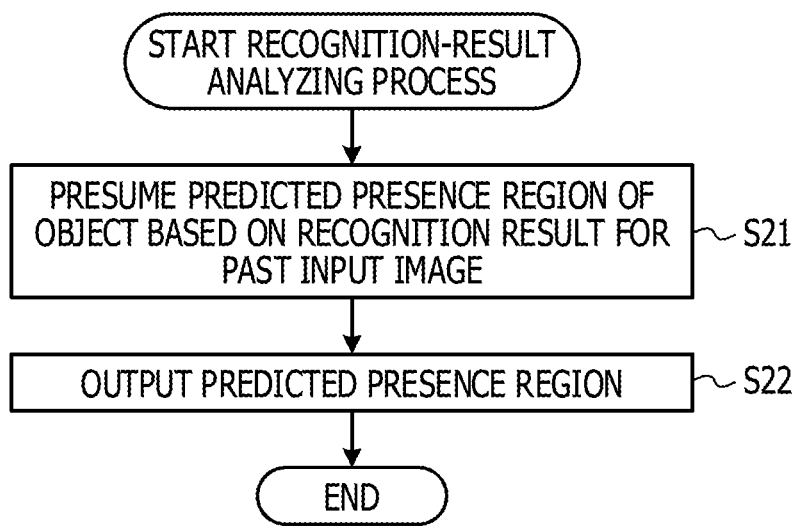
FIG. 15 is a flowchart illustrating an example of the recognition-result analyzing process in FIG. 14.

In the recognition-result analyzing process, the presuming unit 171 of the recognition-result analyzing unit 17 presumes the predicted presence region of the object based on the recognition result for the past input image (step S21), as illustrated in FIG. 15.

The output unit 172 of the recognition-result analyzing unit 17 outputs the presumed predicted presence region to, for example, the proposed-region calculating unit 14 (step S22), and the process ends.

The details of the process of presuming the predicted presence region of the object in step S21 will be described later.

Second Example

Figure 16:
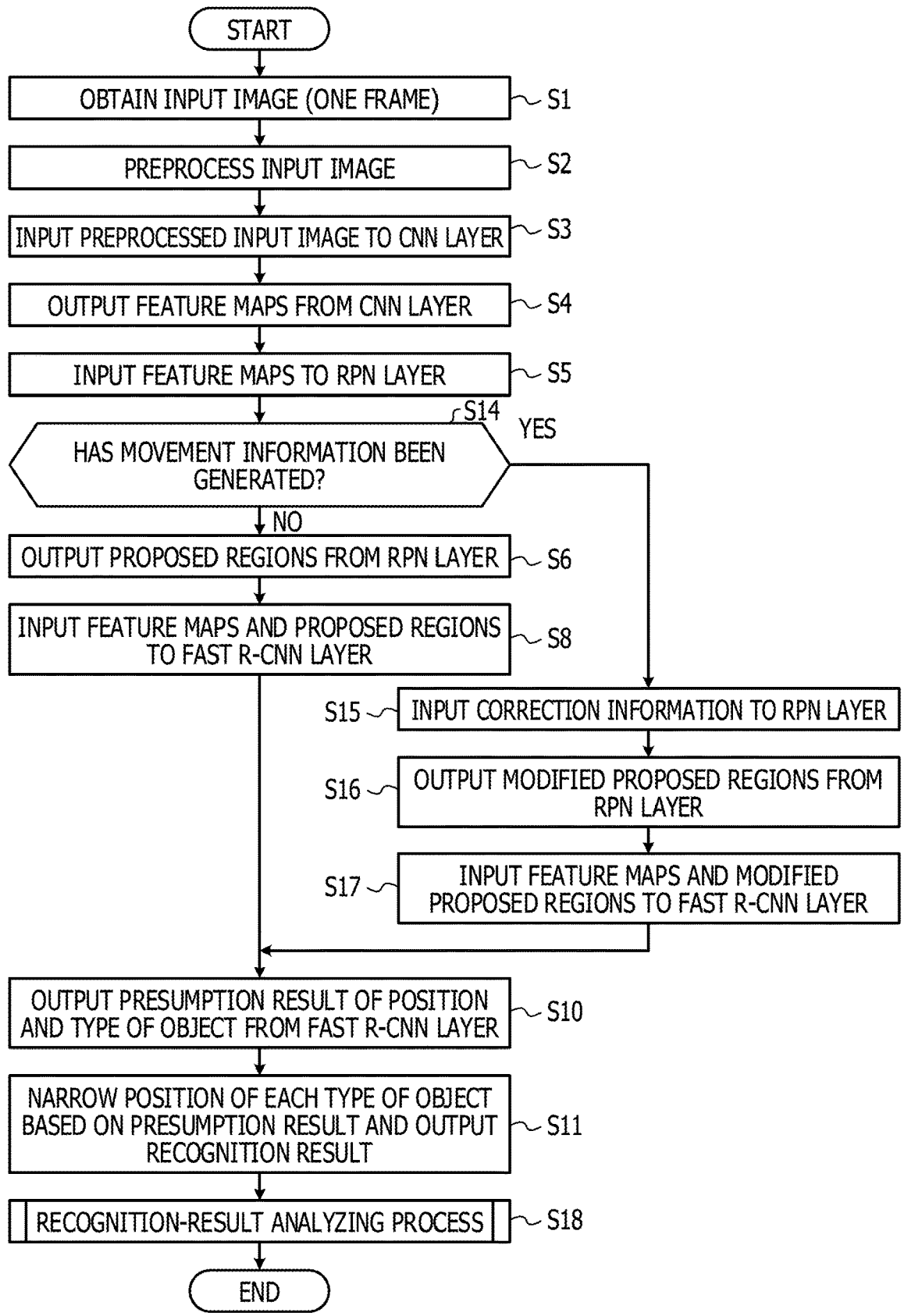
FIG. 16 is a flowchart illustrating an example of a process in a second example performed by the detecting apparatus.

In the second example, as illustrated in FIG. 16, the process from step S1 to S5 is the same as the process of the first example illustrated in FIG. 14.

When in step S5 the feature-map calculating unit 13 inputs the feature maps to the proposed-region calculating unit 14 (RPN layer 140), the process branches according to whether movement information is generated (step S14).

If no movement information is generated (step S14: No), the proposed-region calculating unit 14 outputs proposed regions from the RPN layer 140 (step S6).

Next, the feature maps from the feature-map calculating unit 13 and the proposed regions from the proposed-region calculating unit 14 are input to the object-position and -type presuming unit 15 (step S8). Then the process goes to step S10.

In contrast, if movement information is generated (step S14: Yes), correction information from the recognition-result analyzing unit 17 is input to the proposed-region calculating unit 14 in addition to the feature maps in step S5 (step S15). The correction information may be information for increasing the score of a proposed region close to the predicted region (for example, with large overlap). Examples of the correction information include a score itself after the proposed region is corrected and a factor for weighing the score so as to make the score higher than the scores of the other proposed regions.

The proposed-region calculating unit 14 outputs modified proposed regions whose scores are corrected using the correction information from the RPN layer 140 (step S16).

Next, the feature maps from the feature-map calculating unit 13 and the modified proposed regions from the proposed-region calculating unit 14 are input to the object-position and -type presuming unit 15 (step S17). Then the process goes to step S10.

In step S10, the object-position and -type presuming unit 15 outputs the result of presumption of the position and type of the object from the Fast R-CNN layer 150.

The presumption-result selecting unit 16 narrows down the position of each type of object based on the presumption result from the object-position and -type presuming unit 15 and outputs the recognition result of the position and type of the object as the result of narrowing (step S11).

The recognition-result analyzing unit 17 executes a recognition-result analyzing process according to the second example based on the recognition result input from the presumption-result selecting unit 16 (step S18), and the process on one input image (one frame) input in step S1 ends.

Figure 17:
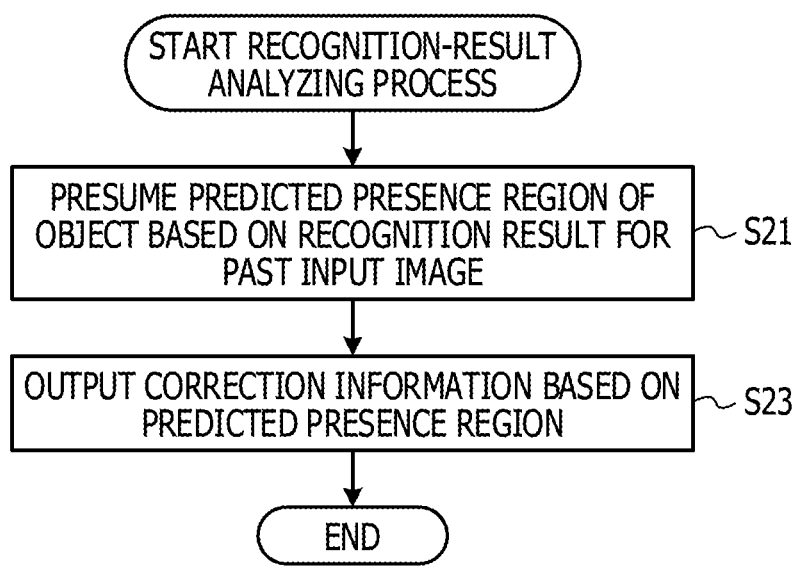
FIG. 17 is a flowchart illustrating an example of the recognition-result analyzing process in FIG. 16.

As illustrated in FIG. 17, in the recognition-result analyzing process, the presuming unit 171 of the recognition-result analyzing unit 17 presumes the predicted presence region of the object based on the recognition result for the past input image (step S21).

The output unit 172 of the recognition-result analyzing unit 17 outputs correction information based on the presumed predicted presence region to, for example, the proposed-region calculating unit 14 (step S23), and the process ends.

The details of the process for presuming the predicted presence region of the object in step S21 will be described later.

[1-4] Description of Processing for Presuming Predicted Presence Region

Next, the process for presuming the predicted presence region of the object performed by the recognition-result analyzing unit 17 will be described. In the presuming process, the presuming unit 171 of the recognition-result analyzing unit 17 may presume the predicted presence region using one or two or more combinations of the following methods.

First Method

First an example of a first method will be described. As illustrated at the left of FIG. 18, suppose that a region s(t0)=(x(t0), y(t0), w(t0), h(t0)) in which a dog, which is an example of the object, is detected as a rectangular region at t=t0 using the Faster R-CNN. Sign (x(t0), y(t0)) denotes the center position of the detected region, and (w(t0), h(t0)) denotes the width and the height of the detected region, where t is a value that specifies the time (timing) of the image data 111 in the image sequence, which corresponds to the frame in the following example.

Assume that a region in which the dog illustrated at the left in FIG. 18 can be detected at t=t0+1 is limited to a region in a certain range centered on s(t0)=(x(t0), y(t0), w(t0), h(t0)), detected at t=t0.

For example, suppose that a dog is detected at t=t0+1, as illustrated at the right in FIG. 18. The detected region at t=t0+1 is expressed as s(t0+1)=(x(t0+1), y(t0+1), w(t0+1), h(t0+1)).

If the value of ($\Delta x$, $\Delta y$, $\Delta w$, $\Delta h$)=s(t0+1)−s(t0) is in a predetermined range or less, the presuming unit 171 may determine that the dog detected at t=t0+1 is the same as the dog detected in the preceding frame (t=t0).

To determine whether an object detected in a certain frame is the same as an object detected in the preceding frame, one or a combination of two or more of methods (a) to (c) may be used.

(a) For example, the presuming unit 171 may determine a range r in which the center position is variable, as expressed as $(\Delta x^2 + \Delta y^2)^{1/2} < r$, and may determine a range in which the width and height of the region are variable, as expressed as $|\Delta w| < \Delta w\_max$ and $|\Delta h| < \Delta h\_max$. The values of r, $\Delta w\_max$, and $\Delta h\_max$ may be adjustable values based on the type of the detected object, the frame rate at the observation, and the size (w, h) of the detected rectangular region. Alternatively, the values of r, $\Delta w\_max$, and $\Delta h\_max$ may be fixed values according to predetermined rules.

(b) Alternatively, the presuming unit 171 may evaluate the size of the overlap between the object detected region in a certain frame and the object detected region in the preceding frame using an intersection of union (IoU) value. If the IoU value is greater than or equal to a certain threshold, the presuming unit 171 may determine that the objects are the same object.

(c) Alternatively, the presuming unit 171 may use a correlation value of pixels of the region detected at t=t0 and the region detected at t=t0+1.

If the presuming unit 171 determines that the dog detected at t=t0 and the dog detected at t=t0+1 are the same dog, the presuming unit 171 may obtain the temporal change ds/dt of x, y, w, and h based on the values of (x, y, w, h) detected at t=t0 and t=t0+1. The temporal change is expressed as ds/dt=(dx/dt, dy/dt, dw/dt, dh/dt).

In the case of t=t0+2, the presuming unit 171 may presume the value of a predicted region s(t0+2|t0+1) at time t=t0+2 from s(t=t0+2|t0+1)=s(t0+1)+ds/dt×$\Delta t$ using the value of ds/dt obtained above, where $\Delta t$ is the time interval between the frames. The predicted region is expressed as s(t0+2|t0+1)=(x(t0+2|t0+1), y(t0+2|t0+1), w(t0+2|t0+1), h(t0+2|t0+1)).

The output unit 172 may output the movement information to the Faster R-CNN based on the value of the predicted region obtained above.

The value of a predicted region at t=t3 may be presumed by respectively replacing the time t=t0, t0+1, t0+2 with time t=t0+1, t0+2, t0+3. This also applies to t=t4 onward.

Second Method

Next, an example of a second method will be described. The second method is an example in which the predicted region is presumed using a Kalman filter uniform motion model.

For example, the Kalman filter uniform motion model may have a state vector $x_{c,i,k}$ illustrated in FIG. 19, where c is the type of the tracked object, i is identification information (for example, number) on the tracked object, and k is time (for example, frame number).

As illustrated in FIG. 19, the presuming unit 171 may hold a state vector $x_{c,i,k}$ in which the object type c, presence region (x, y, w, h), and its speed (x(dot),y(dot),w(dot),h(dot)) are arranged for each tracked object. If the objects of the same type detected by the object detecting NN include an object having a detected region close to the predicted position in the four-dimensional observation vector space (x, y, w, h), the presuming unit 171 may execute a Kalman filter update process using the detected region as an observation value. The observation value may be an observation vector $z_{c,j,k}$ illustrated in FIG. 19, where c is the type of the detected object, j is the identification information (for example, number) on the detected object, and k is time (for example, frame number).

As illustrated in FIG. 19, the transition model denoted by "$x_k$" may be expressed as Eq. (1), and the observation model denoted by "$z_k$" may be expressed as Eq. (2). In Eq. (1), the sign "F" denotes a state transition matrix (see FIG. 19), and "$w_k$" denotes process noise. In Eq. (2), the sign "H" denotes an observation matrix (see FIG. 19), and "$v_k$" denotes observation noise.

$$x_k = Fx_{k-1} + w_k \quad (1)$$

$$z_k = Hx_k + v_k \quad (2)$$

Association (data association) of the tracked object and the detected object may use one of the following methods (i) to (iv).

(i) A method using a detected object nearest to the predicted position of the tracked object as an observation value for use in the Kalman filter update process (Nearest Neighbor).

(ii) A method of performing the method (i) under a constraint condition in which the tracked target and the detected object are associated one to one (Global Nearest Neighbor).

(iii) A method of obtaining the weighted average of the assignment candidates and presuming the state vector of the tracked object (Joint Probabilistic Data Association [JPDA]).

(iv) A method of constructing a hypothesis tree of allocation hypotheses over a plurality of frames and pruning back thereafter (Multiple Hypothesis Tracking [MHT]).

A Kalman filter prediction process may use Eqs. (3) and (4). Eq. (3) expresses a predicted estimate, and Eq. (4) expresses a prediction error matrix.

$$\hat{x}_{k|k-1} = F\hat{x}_{k-1|k-1} \tag{3}$$

$$\overline{P}_{k|k-1} = FP_{k-1|k-1}F_k^T + Q \tag{4}$$

In the case where the change amounts of the pixel value and the pixel length per frame are used as the reference as the unit of the change amounts of the center position, the width, and the height, the presuming unit 171 may perform calculations as dt=1.

The Kalman filter update process may use Eqs. (5) to (9). Eq. (5) expresses the covariance of observation residual errors. Eq. (6) expresses an optimum Kalman gain. Eq. (7) expresses observation residual errors (innovation). Eq. (8) expresses an estimate in the updated state. Eq. (9) expresses the covariance of updated errors.

$$S_k = R + HP_{k|k-1}H^T \tag{5}$$

$$K_k = P_{k|k-1}H^T S_k^{-1} \tag{6}$$

$$e_k = z_k - H\hat{x}_{k|k-1} \tag{7}$$

$$\hat{x}_{k|k} = \hat{x}_{k|k-1} + K_k e_k \tag{8}$$

$$P_{k|k} = (1 - K_k H)P_{k|k-1} \tag{9}$$

The presuming unit 171 may change the initial value P0|0 of the prediction error matrix and the values of constants $q_x$, $q_y$, and so on of a process noise covariance matrix Q (see FIG. 19) according to the type and the value (w, h) of the object detected using the object detecting NN. The process noise covariance matrix Q is a parameter related to the amount of change of the predicted region.

This allows the presuming unit 171 to estimate the moving range of animals and vehicles that move fast large and to estimate the moving range of a nearby object large, allowing higher-accuracy object tracking and detection. Furthermore, presumption of an object type, such as "horse" and context information, such as "jockey on a horse", further increases the motion prediction accuracy.

Since the size of a tracked target changes among frames, the values of $q_x$ and $q_y$ that determine the value of Q may be determined as the function of the size (w, h) of the tracked object.

Third Method

Next, an example of a third method will be described. The third method is an example in which multiple hypothesis tracking (MHT) is employed as an example of the association between a tracked object and a detected object (data association).

The following method employs methods (I) and (II) using the MHT in the method of presuming the predicted region of the tracked object using a tracking filter such as the Kalman filter uniform motion model described in the second method.

(I) Providing observation vector to tracking filter.

(II) Method for setting appropriate determination conditions using the value of obtained predicted region in the method according to the embodiment.

There is a known method for tracking an image feature point using the MHT (for example, see "An efficient implementation and evaluation of Reid's multiple hypothesis tracking algorithm for visual tracking," Ingemar J. Cox and Sunita L. Hingorani, ICPR, pp. A:437-442, 1994, and "An Efficient Implementation of Reid's Multiple Hypothesis Tracking Algorithm and Its Evaluation for the Purpose of Visual Tracking", Ingemar J. Cox and Sunita L. Hingorani, IEEE Transactions On Pattern Analysis And Machine Intelligence, Vol. 18, No. 2, pp. 138-150, 1996).

In the above example method, association of the coordinate positions (x, y) of a plurality of tracked target points presumed using a tracking filter with a plurality of corner feature point positions (x, y) extracted from the image (data association) is performed.

In an embodiment, as illustrated in FIG. 20, the above method is extended, and a four-dimensional coordinate (x, y, w, h) indicating the object detected region is used to associate a plurality of tracked objects with a plurality of detected objects.

Figure 21:
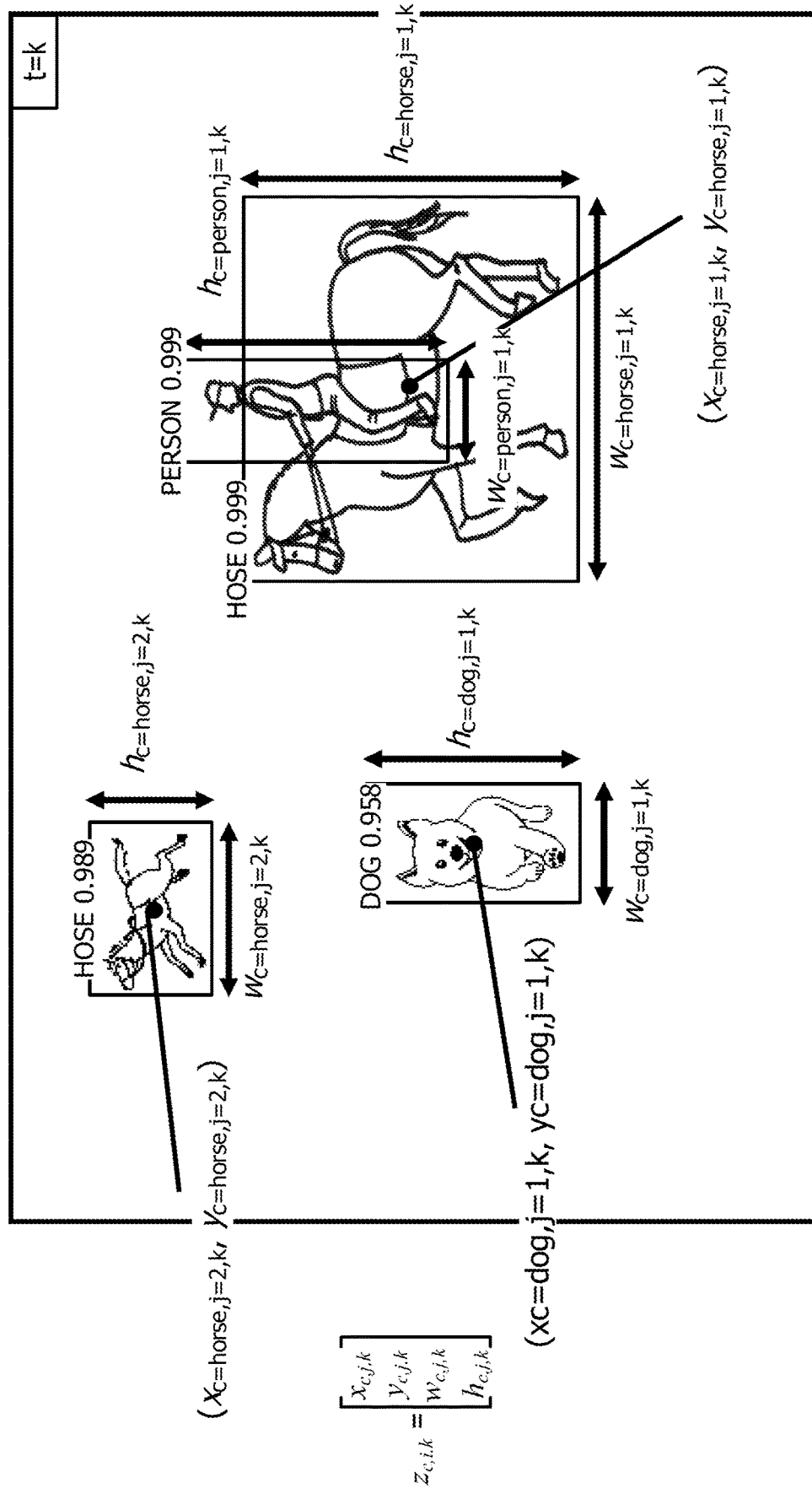
FIG. 21 is a diagram illustrating an example of the third method for the predicted-region presuming process.

For example, suppose a case in which observation data illustrated in FIG. 21 is obtained. In this case, the presuming unit 171 may associate the plurality of types of tracked objects with the detected objects. For example, as illustrated in FIG. 21, the detected object (score: dog 0.958) is associated with the dog, which is a tracked object. The coordinates of the detected object are ($x_c$=dog, j=1, k, $y_c$=dog, j=1, k), $w_c$=dog, j=1, k, $h_c$=dog, j=1, k.

Figure 22:
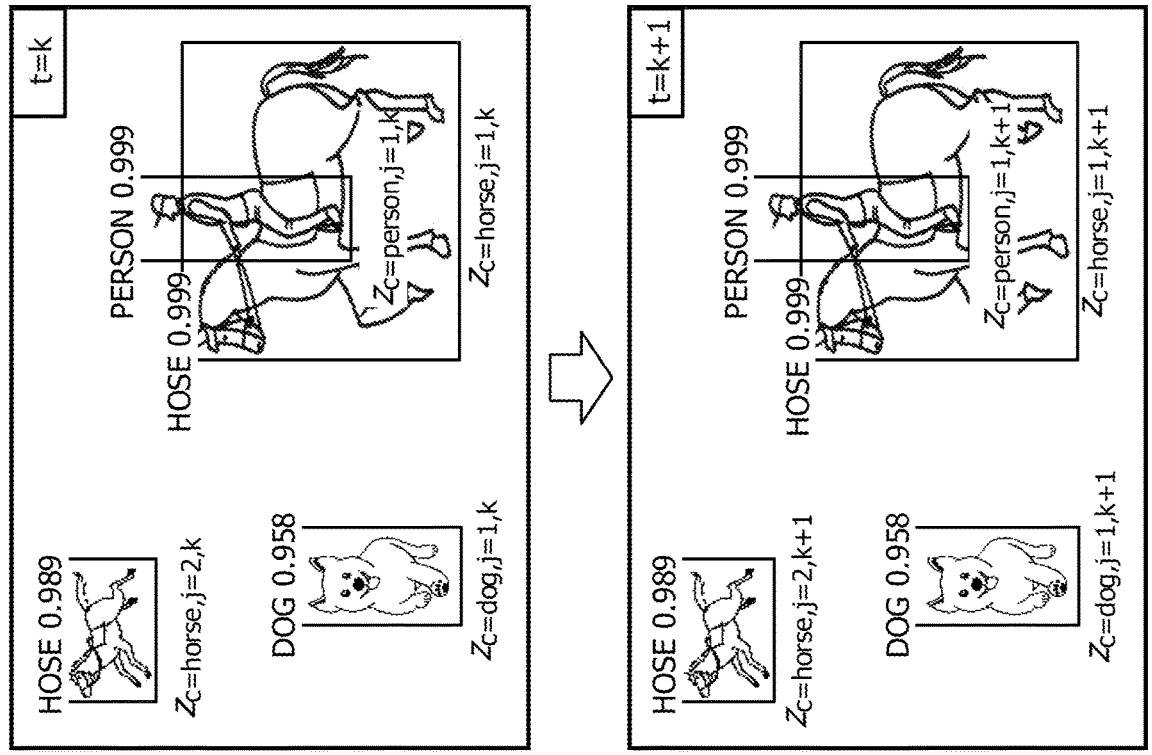
FIG. 22 is a diagram illustrating an example of the third method for the predicted-region presuming process.

As illustrated in FIG. 22, the presuming unit 171 may obtain the four-dimensional observation vectors $z_{c,j,k}$ indicating the object detected region (x, y, w, h) in each frame for each type of the detected objects.

The observation vectors $z_{c,j,k}$ can be the starting point of tracking from the frame. The presuming unit 171 may start the tracking with the velocity component of the state vector $x_{c,j,k}$ illustrated at the top (t=k) in FIG. 22 set at "0", and the value of the observation point (x, y, w, h) set at the initial position (x, y, w, h) of the tracked object.

The presuming unit 171 may presume the value of the state vector $x_{c,j,k}$ of the tracked object in each latest frame based on the data on the observation point sequence in the four-dimensional space (x, y, w, h) observed until the previous frame. The value of the state vector may be predicted using the calculation formula for the Kalman filter prediction process, as described in the second method (see Eqs. (3) and (4)).

The presuming unit 171 may assign the observation point (x, y, w, h) detected from the image as the observation value of the tracked object. The observation point (detected object) to be assigned may be limited only to an object of the same type as the tracked object. For example, the presuming unit 171 may assign an observation point in a gate region centered on the predicted position of the tracked object under a certain condition.

The probability density of a predicted observation position $z_k$ predicted using the Kalman filter of the third method has a multi-dimensional normal distribution, as expressed as Eq. (10), in a four-dimensional Euclidean space whose axes are the parameters (x, y, w, h) of the rectangular region that defines the object detected region.

$$f(z_k) = \frac{1}{(2\pi)^2 |S_k|^{\frac{1}{2}}} \exp\left(-\frac{1}{2}[z_k - H\hat{x}_{k|k-1}]^T S_k^{-1} [z_k - H\hat{x}_{k|k-1}]\right) \tag{10}$$

The sign $S_k$ denotes the covariance matrix of observation residual errors calculated using Eq. (11) (as well as Eq. (5)) at time t=k.

$$S_k = R + HP_{k|k-1}H^T \tag{11}$$

While the value of the residual covariance matrix $S_k$ is calculated as part of the Kalman filter update process, the value can also be used to define the range of the position and the gate region of an observation point that can be assigned to the tracked object.

The sign R denotes an observation noise covariance matrix. For example, in a usage scene where a camera moves, the position of the object changes as the camera moves. In this case, the presuming unit 171 can reflect the position of the object changed due to the motion of the camera to the model by increasing the value of the observation noise covariance matrix R. Thus, the use of the detection result in the past frames can increase the accuracy of object detection.

The term of Eq. (12) (as well as Eq. (7)) in the multi-dimensional normal distribution of Eq. (10) is an observation residual error. The observation residual error is the difference between a predicted position (see Eq. (14)) presumed from the prediction value (see Eq. (13)) of the state vector in the frame at time t=k and the coordinates of an observation point actually observed.

$$e_k = z_k - H\hat{x}_{k|k-1} \quad (12)$$

$$\text{Predicted value} = \hat{x}_{k|k-1} \quad (13)$$

$$\text{Predicted position} = H\hat{x}_{k|k-1} \quad (14)$$

The distribution of the observation residual errors reflects observation noise during observation and process noise during state transition. The model of the third method has the multi-dimensional normal distribution as expressed as Eq. (10).

The presuming unit 171 may define a gate region as a region in which the value of the probability density function takes a value greater than or equal to a certain threshold. The gate region may be defined as a region in which a value obtained by integrating the probability density function for (x, y, w, h) in the gate region takes a certain threshold, for example, 0.99. Also in this case, the presuming unit 171 may define the gate region so that the value of the probability density function is fixed in a boundary region separating the inside and the outside of the gate region.

The presuming unit 171 may assign an observation point in the thus-defined gate region to the predicted position as an assignment candidate.

When the gate region is a region in which the integral value of the density function is a certain value (for example, 0.99), the gate region is a four-dimensional elliptical region.

Figure 23:
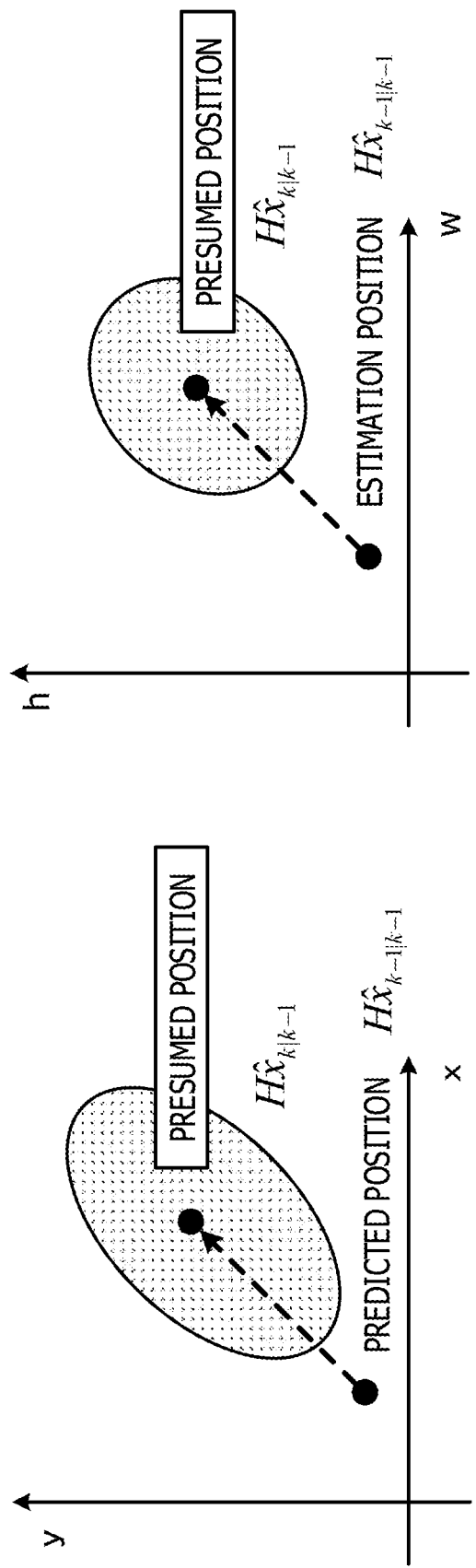
FIG. 23 is a diagram illustrating an example of a cross section of a gate region.

FIG. 23 illustrates an example of the image of a cross section obtained by fixing the ellipsoid as (w, h)=(const_w, const_h) and (x, y)=(const_x, const_y). FIG. 23 illustrates the interior of the gate region in half tone.

The presuming unit 171 may generate an assignment hypothesis for assigning the observation point in the thus-defined gate region to the tracked object as an assignment candidate.

As observation of the observation point is continued at positions close to the predicted position, the likelihood of the assignment increases. When the likelihood of the assignment exceeds a certain threshold, the presuming unit 171 may output movement information to the Faster R-CNN based on the value of the obtained predicted region.

In the MHT, an unobserved object to which an observation point in the gate region is not assigned can also be an assignment candidate. This allows continuing the tracking even when the tracked object disappears such as when the tracked object is temporarily hidden behind another object.

For example, the presuming unit 171 may generate an assignment hypothesis for assigning a plurality of tracked objects to a plurality of detected objects according to the framework of the MHT. The assignment hypothesis may be generated every time an image of each frame is observed.

Since the process of generating a plurality of assignment hypotheses in the latest frame from a plurality of assignment hypotheses generated until the preceding frame is repeatedly performed, the tree of the assignment hypotheses grows. The presuming unit 171 may prune assignment hypotheses with low likelihood to delete them according to limitation of calculation resources, such as the memory or the processor of the detecting apparatus 1.

Thus, not an assignment hypothesis is determined for each frame but a plurality of assignment hypotheses are generated for a plurality of frames, and an assignment hypothesis is determined later back for the preceding frames, data association resistant to noise and occlusion generated for each frame can be achieved.

The detecting apparatus 1 according to an embodiment may detect the position and type of an object with the Faster R-CNN by using the information on a predicted region obtained using the above method. This increases the accuracy of object detection.

Fourth Method

In a fourth method, the presuming unit 171 uses, as observation data, the output (rectangular regions with scores) of the object detection NN before the rectangular regions are narrowed down by the NMS processing. The fourth method may be applied to the second example of the movement information.

Figure 24:
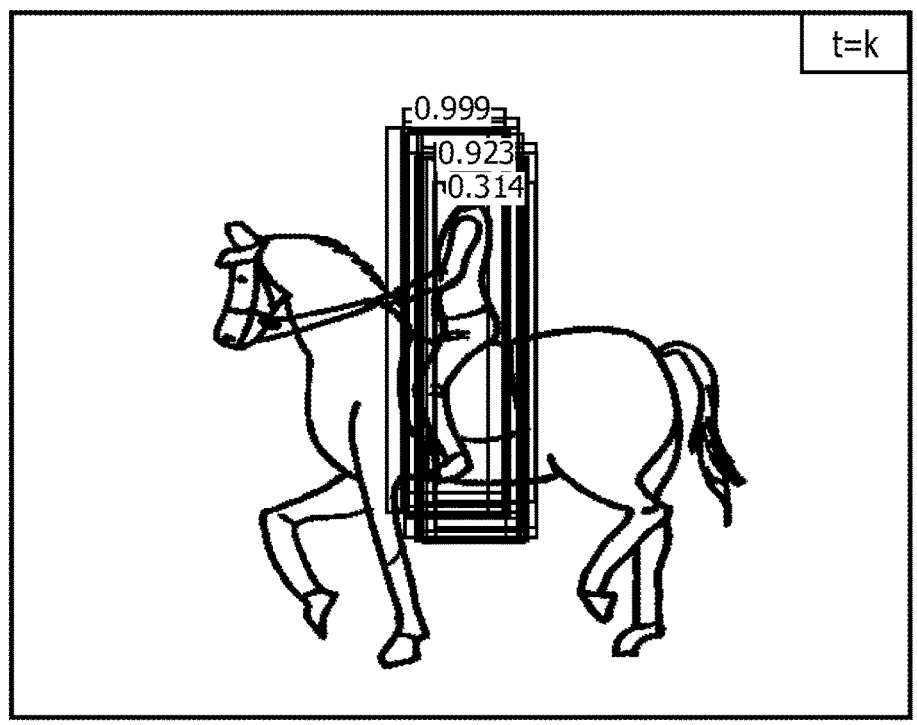
FIG. 24 is a diagram illustrating an example of a fourth method for the predicted-region presuming process.

FIG. 24 is a diagram illustrating an example of a detected region before the rectangular regions are narrowed in the case where the type of the detected object is "person". For example, the detected region illustrated in FIG. 24 is information (proposed regions) output from the candidate-region and score calculating unit 141 of the proposed-region calculating unit 14.

As illustrated in FIG. 24, the observation vector corresponding to each rectangular region is expressed as $z_{c,j,k}$, and the score assigned to each detected region is expressed as $p_{c,j,k}$, where c is the type of the detected object, j is the number of the detected object, and k is time (for example, frame number).

The presuming unit 171 may assign a plurality of observation points (detected regions) observed in the individual frames to the tracked object, as in the third method.

In the fourth method, multiple observation points (the detected object candidate regions as illustrated in FIG. 24) observed around the detection target in each frame are assigned to the tracked object before being narrowed down as detection results with small overlap.

When calculating the likelihood of the assignment based on the data association method such as the MHT, the presuming unit 171 may take into account the value of the score $p_{c,j,k}$ of each detected candidate region in addition to the probability density of the observation point (rectangular region) as in Eq. (10) presumed from the motion of the tracked object. An example of the likelihood in which the score of the candidate region is taken into account is expressed as $p_{c,j,k} \cdot f(z_{c,j,k})$.

The process of generating an assignment hypothesis in the observation point space described above may be considered as a process for associating a predicted region determined from detected regions until the preceding frame with the detected region of the latest frame (association of observation regions).

Figure 25:
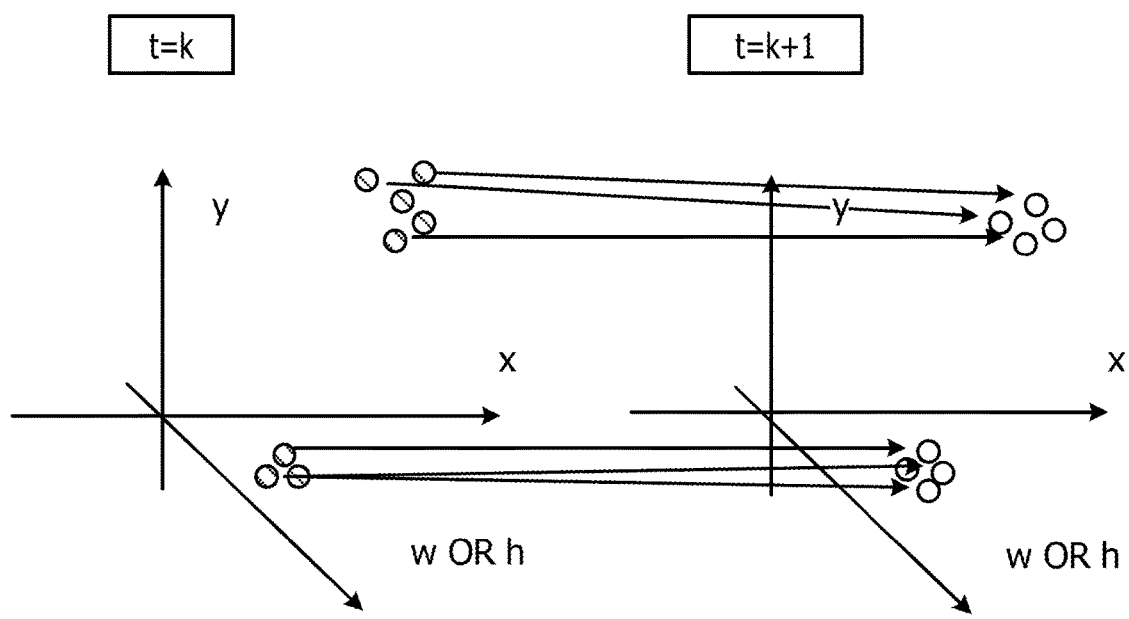
FIG. 25 is a diagram illustrating an example of association of observation points in a four-dimensional Euclid space.

FIG. 25 is a diagram illustrating the association of observation regions as association of observation points in a four-dimensional Euclid space. FIG. 25 illustrates a three-dimensional image diagram in which one of w-axis and h-axis is omitted.

Figure 26:
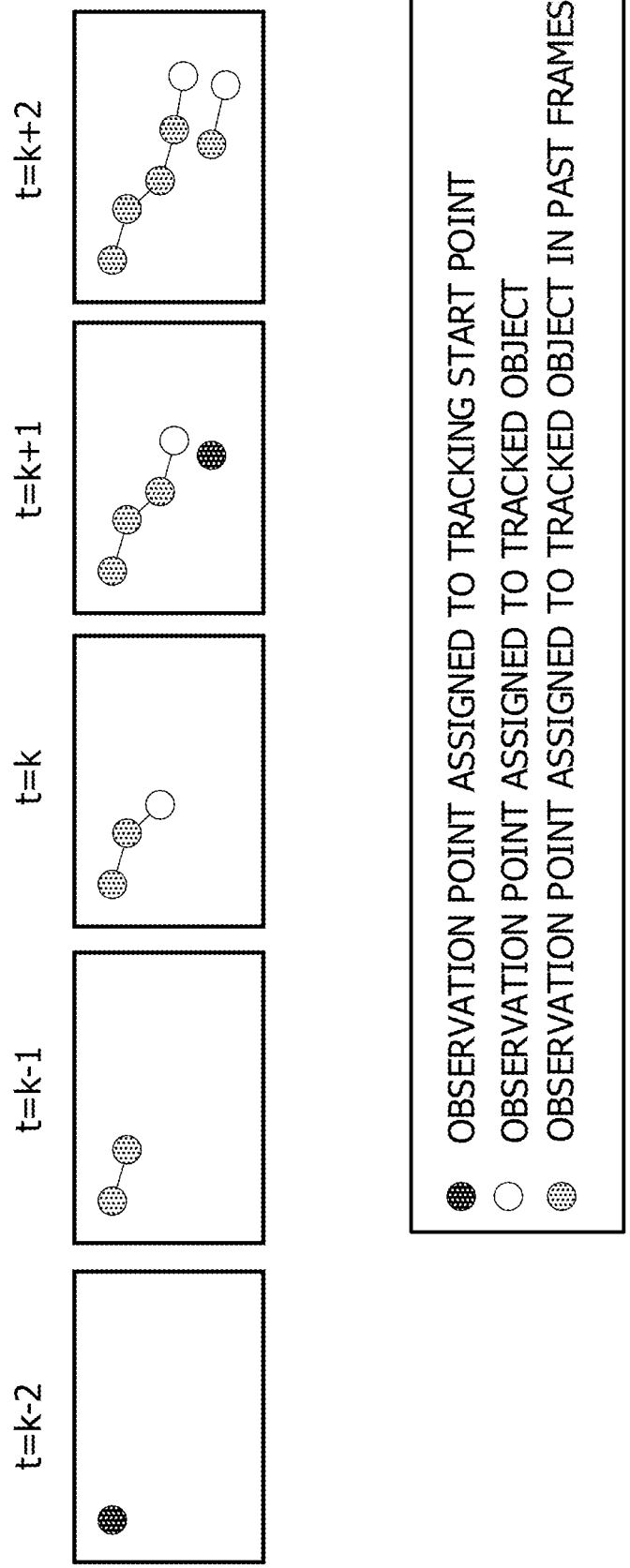
FIG. 26 is a diagram illustrating an example of a method for assigning a plurality of observation points observed in each frame to the tracked object.

FIG. 26 is a diagram illustrating an example of a method for assigning a plurality of observation points (detected regions) observed in each frame to the tracked object using the MHT. In FIG. 26, two observation points are observed at t=k+1, and one observation point is observed at the other times. FIG. 26 illustrates a two-dimensional image, not a four-dimensional image.

Figure 27:
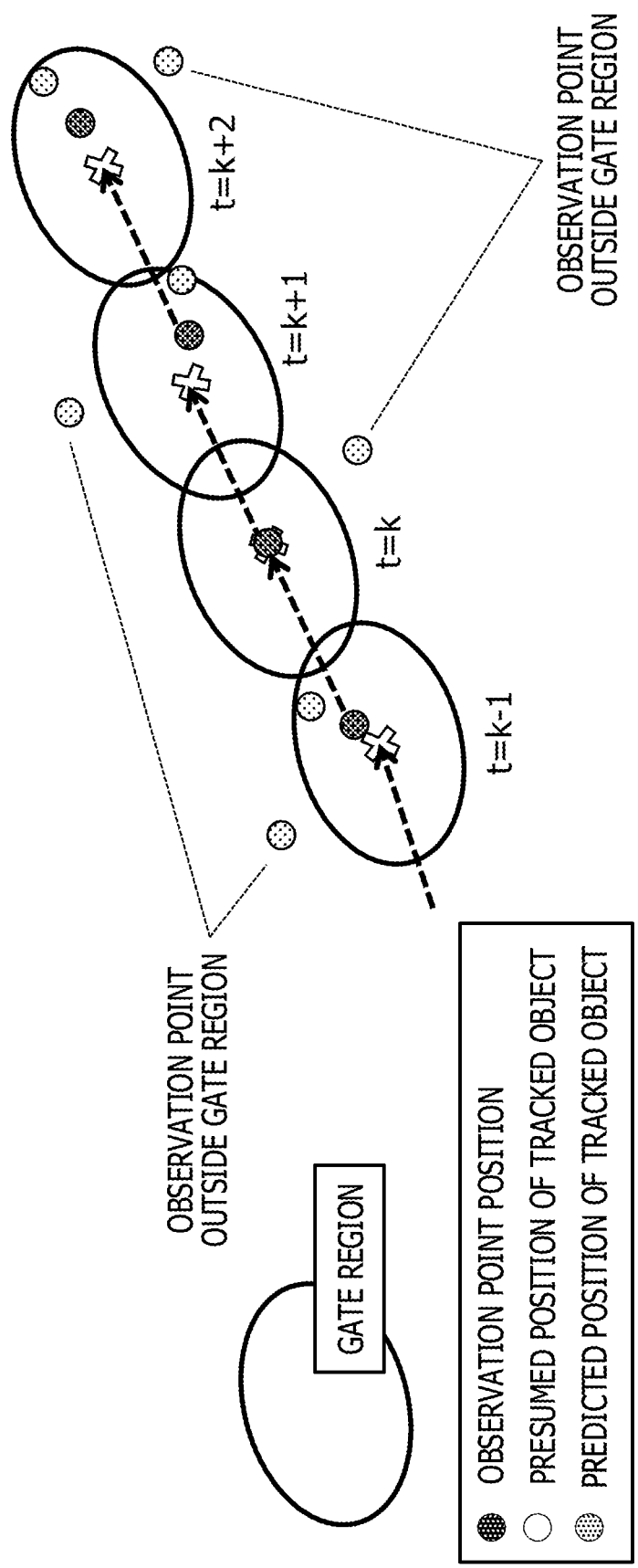
FIG. 27 is a diagram illustrating an example of association of a hypothesis to an unobserved object and a Kalman filter predicting updating process.

FIG. 27 is a diagram illustrating association of a hypothesis to an unobserved object in the MHT and the Kalman filter predicting and updating process. FIG. 27 illustrates an example of calculation of the predicted position, the presumed position, and the observation point of the tracked object and the gate region using a tracking filter in the case where the gate region contains one observation point. FIG. 27 illustrates how the observation point in the gate region is assigned to the tracked object using the MHT.

In the example of FIG. 27, an observation point is assigned in the frames at time t=k−1, k+1, and k+2, and an unobserved object is assigned in the frame at time t=k. Of the observation points in the image, only the observation point in the gate region may be an assignment candidate. When the observation point is assigned, the presumed position of the tracked object may be corrected to a position nearer to the observation point than the predicted position.

Figure 28:
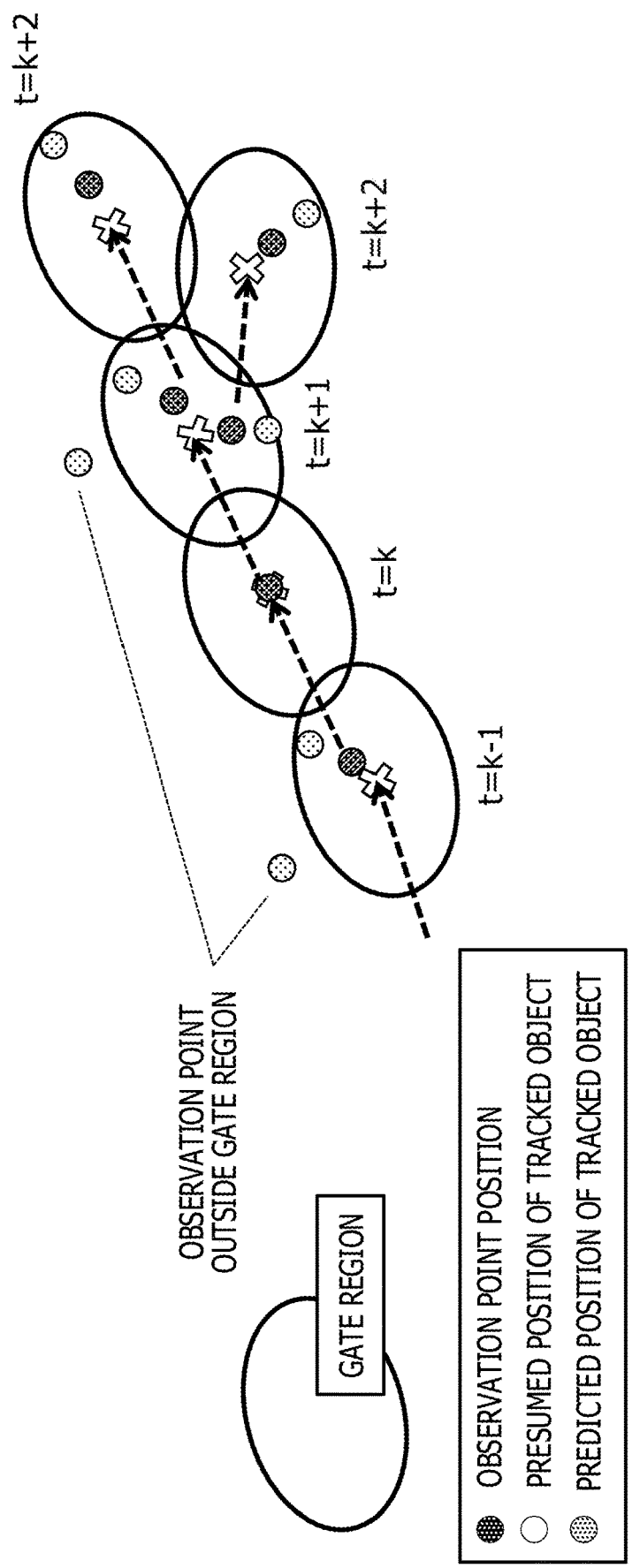
FIG. 28 is a diagram illustrating association of a hypothesis to an unobserved object and a Kalman filter predicting updating process.

FIG. 28 is a diagram illustrating association of a hypothesis to an unobserved object in the MHT and the Kalman filter predicting and updating process. FIG. 28 illustrates an example of calculation of the predicted position, the presumed position, and the observation point of the tracked object and the gate region using a tracking filter in the case where the gate region contains a plurality of observation points and the tracking hypothesis branches.

In the example of FIG. 28, one observation point is assigned at time t=k−1, an unobserved object is assigned at time t=k, and two observation points are assigned at time t=k+1. At time t=k+2, one observation point is assigned to each branched tracking hypothesis.

The methods described with reference to FIGS. 25 to 28 are applicable also to the third method.

Figure 29:
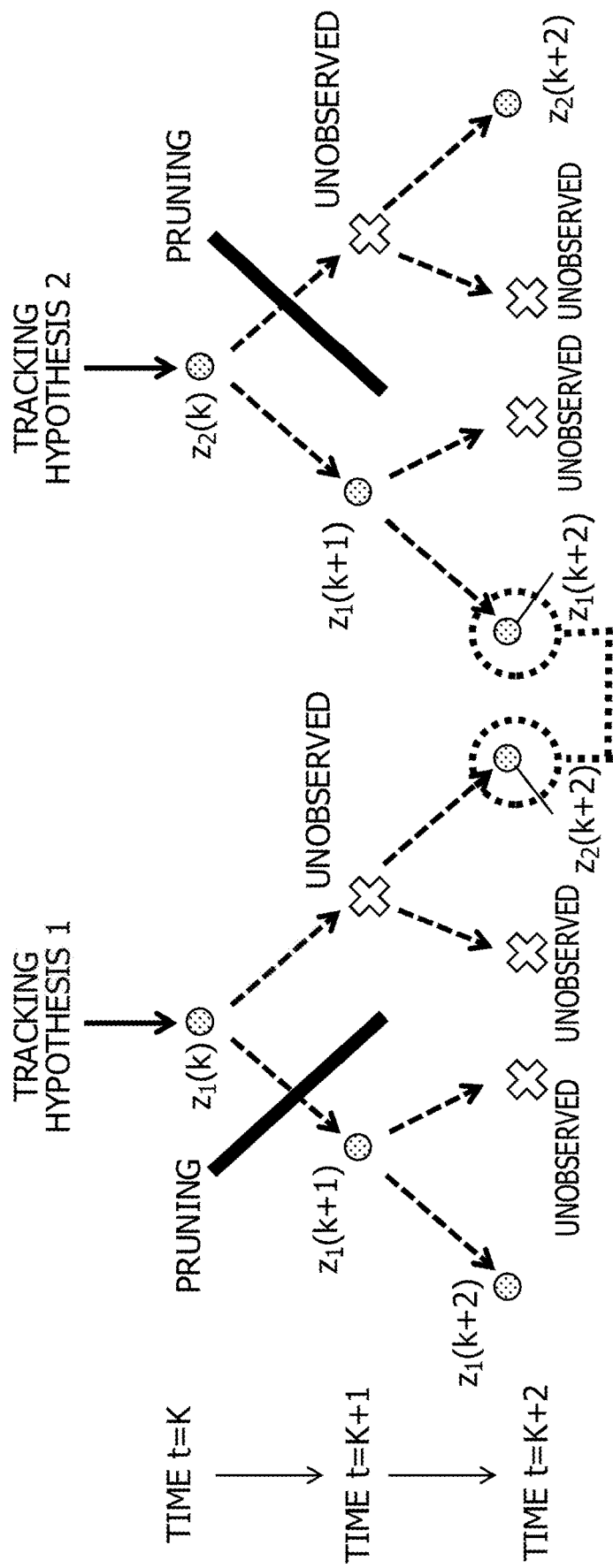
FIG. 29 is a diagram illustrating an example of generation and pruning hypotheses over a plurality of frames.

FIG. 29 is a diagram illustrating an example of generation of hypotheses over a plurality of frames and pruning using the MHT. The presuming unit 171 may repeat generation of assignment hypotheses over a plurality of frames. At that time, the presuming unit 171 may select a combination of assignment hypotheses whose likelihood is the highest from the latest hypothesis tree as a presumption result. The pruning of the hypothesis tree may be executed at appropriate timing according to the limitation of the calculation resources including the memory and the processor.

FIG. 29 illustrates an example in which a combination of hypotheses with the highest likelihood is used as the presumption result. For example, the presuming unit 171 may use an N-Scanback algorithm. The N-Scanback algorithm is an algorithm for selecting an assignment hypothesis whose likelihood at the present time is the highest, determining a hypothesis N−1 frame preceding (in the example of FIG. 29, N=2), and executing pruning of a hypothesis tree starting from another node of the (N−1)th frame.

The output unit 172 may generate movement information based on a plurality of tracking hypotheses obtained using the fourth method and output the movement information to the candidate-region selecting unit 142 of the proposed-region calculating unit 14.

The fourth method uses not an observation point assigned in a normal MHT but a plurality of detected candidate regions with scores (for example, proposed regions), which are to be narrowed down by using another process (for example, the NMS process), as observation points.

This provides the possibility of estimating many detected regions. For that reason, the detecting apparatus 1 may narrow down the detected regions using method (A) or (B) or a combination of methods (A) and (B) described below.

(A) The output unit 172 generates correction information for correcting the scores of the detected regions using the likelihood of the tracking hypothesis obtained by the presuming unit 171. In the NMS process, the candidate-region selecting unit 142 makes a determination based on the correction information from the output unit 172 so that a hypothesis (candidate region) whose likelihood is the maximum has a high score to narrow down the candidate regions.

(B) For (x, y, w, h) that is a starting point for tracking hypothesis generation, the presuming unit 171 uses the values of regions narrowed down through the NMS process and so on and repeats the generation of an assignment hypothesis according to the fourth method. The presuming unit 171 selects a tracking hypothesis with the highest likelihood as a presumption result on the assumption that a tracking hypothesis that branches from a certain common starting point corresponds to only one tracked target. At that time, to reduce overlap between the observation point serving as the starting point of the tracking and the measurement result of the tracking continued object, the presuming unit 171 may exclude detection candidate regions close to the tracking continued object using the following methods (B-1) and (B-2). The starting point of the tracking is, for example, a frame in which each object is detected first.

(B-1) The presuming unit 171 may exclude a region that greatly overlaps with the presumption result obtained as the result of tracking or detection candidate regions selected as having the highest assignment likelihood (which are also the result of detection).

(B-2) The presuming unit 171 may exclude a detection candidate region contained in the gate region of a tracking hypothesis during tracking.

In method (B), the proposed-region calculating unit 14 may apply a narrowing process, such as the NMS process, using the candidate-region selecting unit 142 to candidate regions remaining after the above process performed by the recognition-result analyzing unit 17. The region detected after the narrowing process is used as the starting point of tracking performed by the recognition-result analyzing unit 17.

In the above process according to the fourth method, the candidate-region selecting unit 142 may take a weighted average for detection candidate regions close to the detected object.

For example, the output unit 172 may output as movement information on at least one of "distance from predicted position", "Mahalanobis' distance", "score of detected region", and "likelihood of tracking" to the proposed-region calculating unit 14. The "Mahalanobis' distance" may be defined by term (15) in Eq. (10).

$$[z_k - H\hat{x}_{k|k-1}]^T S_k^{-1} [z_k - H\hat{x}_{k|k-1}] \qquad (15)$$

The candidate-region selecting unit 142 may calculate a weighted average based on the movement information from the output unit 172 for the detection candidate regions in the gate region centered on a predicted region calculated using a tracking filter.

The recognition-result analyzing unit 17 may use the MHT at the start of tracking, and after the tracking is continued to a certain extent, may use joint probabilistic data association (JPDA).

The recognition-result analyzing unit 17 may generate correction information for, for example, increasing the threshold for object detection at the start of tracking and decreasing the threshold for object detection in a region in which the likelihood has exceeded a certain threshold after the tracking is continued. In other words, the candidate-region selecting unit 142 may calculate a weighted average according to the duration of tracking for the threshold of object detection. This increases the accuracy of object detection using information tracked from the past frames even if a region whose likelihood has exceeded a certain threshold after tracking is continued is hidden behind another region (object) in a certain frame.

The result of calculation of the weighted average performed by the candidate-region selecting unit 142 may be input to the object-position and -type presuming unit 15 as proposed regions, which are output from the proposed-region calculating unit 14.

In other words, the candidate-region selecting unit 142 performs the second process for calculating the weighted average of a plurality of sets of candidate regions based on the respective indices of the plurality of sets.

[1-5] Hardware Configuration Example

Next, a hardware configuration example of the detecting apparatus 1 will be described. In one example, the detecting apparatus 1 may be implemented by a computer system including one or more computers, as described above. One or more computers constituting the detecting apparatus 1 are referred to as "computer 10". The hardware configuration example of the computer 10 will be described.

Figure 30:
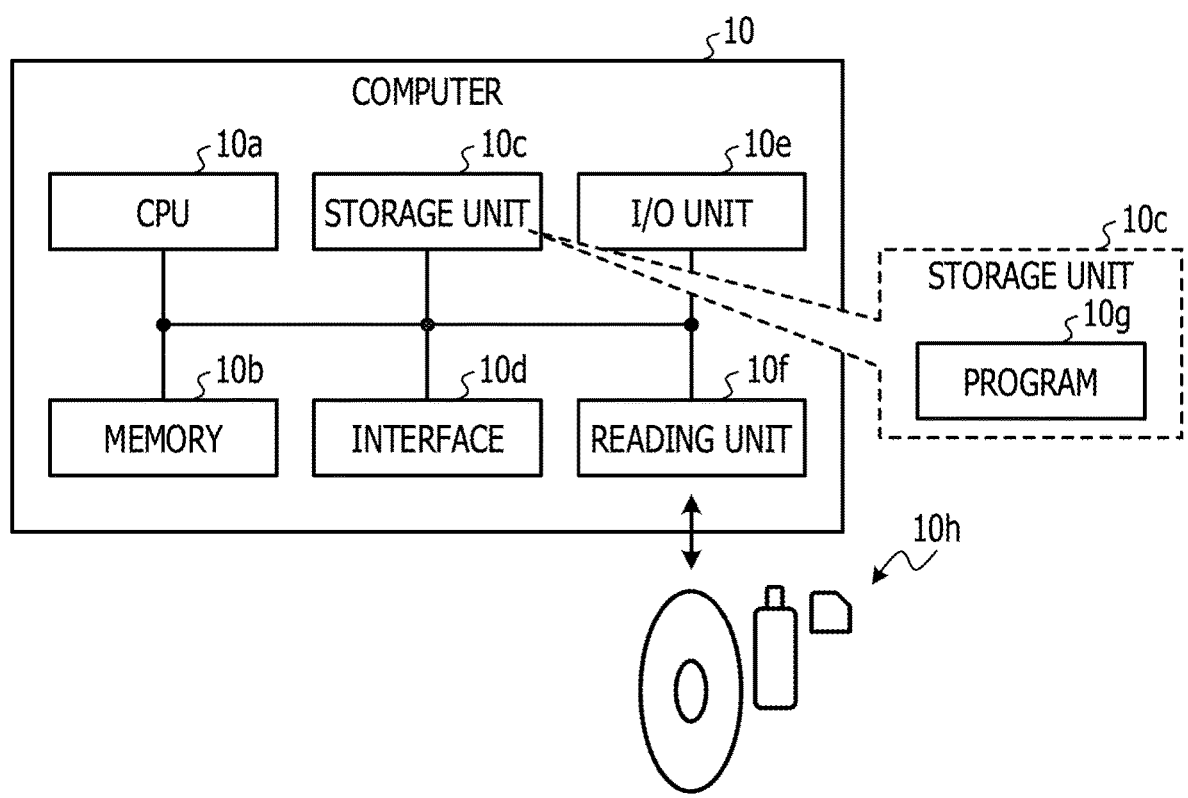
FIG. 30 is a block diagram illustrating a configuration example of the hardware of a computer.

As illustrated in FIG. 30, in one example, the computer 10, which is an example of an information processing apparatus, may include a processor 10a, a memory 10b, a storage unit 10c, an interface (IF) 10d, an input and output (I/O) unit 10e, and a reading unit 10f.

The processor 10a is an example of a processing unit that performs various controls and calculations. The processor 10a may be connected to the blocks 10b to 10f with a bus 10i so as to communicate with each other. The processor 10a may be an integrated circuit (IC), such as a central processing unit (CPU), a graphics processing unit (GPU), a micro processing unit (MPU), a digital signal processor (DSP), an application specific integrated circuit (ASIC), a programmable logic device (PLD) (for example, field programmable gate array [FPGA]).

The memory 10b is an example of hardware that stores various items of data and programs. An example of the memory 10b is a volatile memory, such as a random access memory (RAM), for example, a dynamic RAM (DRAM).

The storage unit 10c is an example of hardware that stores various items of data and programs. For example, the storage unit 10c may be used as a secondary storage unit of the computer 10 and may store an operating system (OS), programs such as firmware and applications, and various items of data. Examples of the storage unit 10c include a magnetic disk unit such as a hard disk drive (HDD), a semiconductor drive unit such as a solid state drive (SSD), and a non-volatile memory. Examples of the non-volatile memory include a flash memory, a storage class memory (SCM), and a read only memory (ROM). The storage unit 10c may store a program 10g for implementing all or part of the various functions of the computer 10.

The IF 10d is an example of a communication interface that controls connection and communication with other devices via a network (not illustrated). An example of the IF 10d is an adaptor based on the Ethernet®, optical communication (for example, Fibre Channel), or the like. The computer 10 may include a communication interface for controlling connection and communication with the administration terminal of an administrator and may download the program 10g via a network (not illustrated) using the communication interface.

The I/O unit 10e may include at least one of an input unit, such as a mouse, keyboard, a touch panel, and an operation button, and an output unit, such as a display, a projector, and a printer.

The reading unit 10f is an example of a reader that reads data or programs stored in a storage medium 10h and outputs it to the processor 10a. The reading unit 10f may include a connecting terminal or unit which the storage medium 10h can be connected to or inserted in. Examples of the reading unit 10f include an adaptor based on Universal Serial Bus (USB), a drive unit for accessing a recording disk, and a card reader for accessing a flash memory, such as a secure digital (SD) card. The storage medium 10h may store the program 10g and so on.

Examples of the storage medium 10h include non-transitory computer-readable storage media, such as a magnetic or optical disk and a flash memory. Examples of the magnetic/optical disk include a flexible disk, a compact disc (CD), a digital versatile disc (DVD), a blu-ray disc, and a holographic versatile disc (HVD). Examples of the flash memory include semiconductor memories, such as a USB flash drive and an SD card. Examples of the CD include a CD-ROM, a compact disc-recordable (CD-R), and a compact disc-rewritable (CD-RW). Examples of the DVD include a DVD-ROM, a DVD-RAM, a DVD-R, a DVD-RW, a DVD+R, and a DVD+RW.

The hardware configuration of the computer 10 described above is given only for illustrative purposes. The hardware in the computer 10 may be increased, decreased, divided, integrated in any combination (for example, any block may be added or deleted, and a bus may be added or deletion as appropriate. If the detecting apparatus 1 is implemented by a plurality of computers 10, one or more hardware may be shared by the plurality of computers 10.

[2] Other Embodiments

The technique according to the embodiment may be modified or changed.

For example, in the detecting apparatus 1 illustrated in FIG. 1, the functions of the image preprocessing unit 12 to the recognition-result analyzing unit 17 may be merged in any combination, or any function may be divided into a plurality of functions.

If the presuming unit 171 can detect the posture of the detected object, the presuming unit 171 may use the posture information for the predicted-region presuming process. For example, animals with standstill posture are unlikely to suddenly move greatly from the positions, but animals who are running or flying are expected to move greatly from the positions.

The presuming unit 171 may use information on the direction of movement expected from the orientation of the objects such as vehicles and animals for the predicted-region presuming process.

The posture information and the information on the moving direction may be presumed using another method different from the object-detection network (for example, Faster R-CNN). In other words, the presuming unit 171 may include a network different from the object detection network.

The result of recognition in object detection, for example, the recognition result 181 obtained by the detecting apparatus 1, may be used for labeling object-detection learning data. For example, if the object type is learned in the Faster R-CNN, a label indicating the object type is to be manually input for each frame. The use of the recognition result 181 can save the time and labor in inputting for each frame.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method comprising:
    executing a first process that includes obtaining movement information on movement of an object from an image sequence;
    executing a second process that includes presuming a set of a candidate region in which an object may be present in a first image in the image sequence and an index indicating probability of presence of the object in the candidate region according to a feature amount of the first image; and
    executing a third process that includes determining a position of the object in the first image by using the set of the candidate region and the index presumed,
    wherein the second process includes correcting information obtained during the presuming based on the obtained movement information.

2. The control method according to claim 1,
    wherein the first process, the second process, and the third process are executed also for a plurality of images at times earlier than the first image in the image sequence, and
    wherein the first process is configured to
        obtain temporal change of the position of the object based on positions of the object determined in the plurality of images at the earlier times, and
        obtain the movement information based on the temporal change of the position of the object.

3. The control method according to claim 1, wherein the second process further includes
    a fourth process that includes presuming a plurality of sets of the candidate region and the index,
    a fifth process that includes narrowing down the plurality of sets to a predetermined number of sets based on the index of each of the plurality of sets, and
    a sixth process that includes presuming a type of an object that is presumed to be present in the candidate region based on the predetermined number of sets of the candidate region and the index and the feature amount of the image,
    wherein the movement information is input to the sixth process.

4. The control method according to claim 3, wherein the movement information includes a predicted region where the object is predicted to be present in the first image.

5. The control method according to claim 1, wherein the second process further includes
    a seventh process that includes presuming a plurality of sets of the candidate region and the index,
    an eighth process that includes narrowing down the plurality of sets to a predetermined number of sets based on the index of each of the plurality of sets, and
    a ninth process that includes presuming a type of an object that is presumed to be present in the candidate region based on the predetermined number of sets of the candidate region and the index and the feature amount of the image, and
    wherein the movement information is input to the eighth process.

6. The control method according to claim 5, wherein the movement information includes correction information for correcting the index of a specific candidate region among candidate regions presumed in the first process.

7. The control method according to claim 1, wherein the second process further includes
    a tenth process that includes presuming a plurality of sets of the candidate region and the index,
    an eleventh process that includes calculating a weighted average of a plurality of candidate regions of the plurality of sets based on the index of each of the plurality of sets, and
    a twelfth process that includes presuming a type of an object that is presumed to be present in the candidate region based on a result of calculation of the weighted average and the feature amount of the image, and
    wherein the movement information is input to the eleventh process.

8. The control method according to claim 1,
    wherein a plurality of reference regions are fixedly arranged in the first image, and
    wherein the second process further includes presuming the candidate region and the index based on each of the plurality of reference regions or a region including a combination of the plurality of reference regions.

9. A non-transitory computer-readable storage medium for storing a control program that causes a computer to execute a process, the process comprising:
    executing a first process that includes obtaining movement information on movement of an object from an image sequence;
    executing a second process that includes presuming a set of a candidate region in which an object may be present in a first image in the image sequence and an index indicating probability of presence of the object in the candidate region according to a feature amount of the first image; and
    executing a third process that includes determining a position of the object in the first image by using the set of the candidate region and the index presumed,
    wherein the second process includes correcting information obtained during the presuming based on the obtained movement information.

10. The non-transitory computer-readable storage medium according to claim 9, wherein the first process, the second process, and the third process are executed also for a plurality of images at times earlier than the first image in the image sequence, and wherein the first process is configured to
obtain temporal change of the position of the object based on positions of the object determined in the plurality of images at the earlier times, and
obtain the movement information based on the temporal change of the position of the object.

11. The non-transitory computer-readable storage medium according to claim 9, wherein the second process further includes
a fourth process that includes presuming a plurality of sets of the candidate region and the index,
a fifth process that includes narrowing down the plurality of sets to a predetermined number of sets based on the index of each of the plurality of sets, and
a sixth process that includes presuming a type of an object that is presumed to be present in the candidate region based on the predetermined number of sets of the candidate region and the index and the feature amount of the image,
wherein the movement information is input to the sixth process.

12. The non-transitory computer-readable storage medium according to claim 11, wherein the movement information includes a predicted region where the object is predicted to be present in the first image.

13. The non-transitory computer-readable storage medium according to claim 9, wherein the second process further includes
a seventh process that includes presuming a plurality of sets of the candidate region and the index,
an eighth process that includes narrowing down the plurality of sets to a predetermined number of sets based on the index of each of the plurality of sets, and
a ninth process that includes presuming a type of an object that is presumed to be present in the candidate region based on the predetermined number of sets of the candidate region and the index and the feature amount of the image, and
wherein the movement information is input to the eighth process.

14. The non-transitory computer-readable storage medium according to claim 13, wherein the movement information includes correction information for correcting the index of a specific candidate region among candidate regions presumed in the first process.

15. The non-transitory computer-readable storage medium according to claim 9, wherein the second process further includes
a tenth process that includes presuming a plurality of sets of the candidate region and the index,
an eleventh process that includes calculating a weighted average of a plurality of candidate regions of the plurality of sets based on the index of each of the plurality of sets, and
a twelfth process that includes presuming a type of an object that is presumed to be present in the candidate region based on a result of calculation of the weighted average and the feature amount of the image, and
wherein the movement information is input to the eleventh process.

16. The non-transitory computer-readable storage medium according to claim 9,
wherein a plurality of reference regions are fixedly arranged in the first image, and
wherein the second process further includes presuming the candidate region and the index based on each of the plurality of reference regions or a region including a combination of the plurality of reference regions.

17. A control apparatus comprising:
a memory; and
a processor coupled to the memory and configured to
execute a first process that includes obtaining movement information on movement of an object from an image sequence;
execute a second process that includes presuming a set of a candidate region in which an object may be present in a first image in the image sequence and an index indicating probability of presence of the object in the candidate region according to a feature amount of the first image; and
execute a third process that includes determining a position of the object in the first image by using the set of the candidate region and the index presumed,
wherein the second process includes correcting information obtained during the presuming based on the obtained movement information.

18. The control apparatus according to claim 17,
wherein the first process, the second process, and the third process are executed also for a plurality of images at times earlier than the first image in the image sequence, and
wherein the first process is configured to
obtain temporal change of the position of the object based on positions of the object determined in the plurality of images at the earlier times, and
obtain the movement information based on the temporal change of the position of the object.

19. The control apparatus according to claim 17, wherein the second process further includes
a fourth process that includes presuming a plurality of sets of the candidate region and the index,
a fifth process that includes narrowing down the plurality of sets to a predetermined number of sets based on the index of each of the plurality of sets, and
a sixth process that includes presuming a type of an object that is presumed to be present in the candidate region based on the predetermined number of sets of the candidate region and the index and the feature amount of the image,
wherein the movement information is input to the sixth process.

20. The control apparatus according to claim 19, wherein the movement information includes a predicted region where the object is predicted to be present in the first image.

* * * * *